(12) United States Patent
Watabe et al.

(10) Patent No.: US 6,731,331 B1
(45) Date of Patent: May 4, 2004

(54) REMOTE-CONTROLLED SHOOTING SYSTEM, VIDEO CAMERA APPARATUS AND REMOTE-CONTROLLED SHOOTING METHOD

(75) Inventors: Shigehiko Watabe, Tokyo (JP); Tetsuji Naoi, Tokyo (JP); Ushio Inoue, Tokyo (JP); Kouji Miyajima, Tokyo (JP); Hatsuo Kimura, Tokyo (JP); Toshitsugu Katsumata, Tokyo (JP); Satoshi Nishiyama, Tokyo (JP); Yukio Tanaka, Tokyo (JP); Akinori Kosako, Tokyo (JP); Yoshikazu Osamemoto, Tokyo (JP); Hiroyoshi Ueno, Tokyo (JP); Akio Komiya, Tokyo (JP)

(73) Assignees: Mitsubishi Denki Kabushiki Kaisha, Tokyo (JP); NTT Data Corporation, Tokyo (JP)

( * ) Notice: Subject to any disclaimer, the term of this patent is extended or adjusted under 35 U.S.C. 154(b) by 727 days.

(21) Appl. No.: 09/610,610

(22) Filed: Jul. 5, 2000

(30) Foreign Application Priority Data

Jul. 7, 1999 (JP) .......................................... 11-193440

(51) Int. Cl.$^7$ ................................................. H04N 7/18
(52) U.S. Cl. ........................................................ 348/144
(58) Field of Search ................................. 348/140, 141, 348/142, 143, 144, 147, 254, 123, 220–225, 160, 145, 146, 148

(56) References Cited

U.S. PATENT DOCUMENTS 5,844,602 A * 12/1998 Lareau et al. ................ 348/144
6,130,705 A * 10/2000 Lareau et al. ................ 348/144

FOREIGN PATENT DOCUMENTS

| JP | 10-257474 | 9/1998 |
| JP | 10-257483 | 9/1998 |

* cited by examiner

Primary Examiner—Vu Le
Assistant Examiner—Behrooz Senfi
(74) Attorney, Agent, or Firm—Burns, Doane, Swecker & Mathis, LLP

(57) ABSTRACT

A shooting instruction device 1 selects one of preset shooting patterns 101 according to the type and scale of the disaster to cope with, then inputs shooting conditions 112 corresponding to the selected shooting pattern, and sends a shooting instruction 103. A video camera apparatus 2 loaded on a helicopter 3 makes a flight plan 106 based on the received shooting instruction 103, then shoots the position of a shooting target, then adds a still picture mark to a video signal 111, and sends it together with associated data 114. An information display device 4 extracts a still picture from a video signal 113 with the still picture mark, and displays the still picture together with the associated data 114.

25 Claims, 20 Drawing Sheets

| (P) BASIC SHOOTING PATTERN | (P1) SINGLE-POINT SHOOTING |
| --- | --- |
| | (P2) MULTIPLE-POINT SHOOTING |
| | (P3) LINE SHOOTING |
| | (P4) AREA SHOOTING |
| | (P5) SPOTLIGHT SHOOTING |
| | (P6) PANORAMIC SHOOTING |
| | (P7) FREE SHOOTING |
| (Q) MODEL SHOOTING PATTERN | (Q1) MODEL SHOOTING PATTERN |
| | (Q2) MODEL SHOOTING PATTERN |
| | ⋮ |

A: SHOOTING TARGET
B: SHOOTING DISTANCE
E: STANDBY AREA

A: SHOOTING TARGET
B: SHOOTING DISTANCE
E: STANDBY AREA

WPT: WAY POINT
D: STILL PICTURE MARKING POSITION
E: STANDBY AREA

WPT: WAY POINT
D: STILL PICTURE MARKING POSITION

A: SHOOTING TARGET
D: STILL PICTURE MARKING POSITION

A: SHOOTING TARGET

A: SHOOTING TARGET

FIG.14

| ITEM | CONTENTS |
|---|---|
| INSTRUCTION NO. | INSTRUCTION ID NO. |
| DATE | DATE OF SENDING INSTRUCTION |
| TIME | TIME OF SENDING INSTRUCTION |
| TYPE | SHOOTING PATTERN |
| POSITION OF TARGET | LATITUDE & LONGITUDE |
| ALTITUDE FOR SHOOTING | ALTITUDE OF HELICOPTER DURING SHOOTING |
| PARAMETERS OF VISIBLE-LIGHT CAMERA | USE/NONUSE OF CAMERA<br>MAGNIFICATION<br>FILTER<br>GAIN |
| PARAMETERS OF INFRARED CAMERA | USE/NONUSE OF CAMERA<br>MAGNIFICATION<br>FILTER<br>GAIN |
| STILL PICTURE SIZE | ACTUAL WIDTH OF STILL PICTURE |
| MESSAGE | MESSAGE TO BE DISPLAYED ON FLIGHT PATH DISPLAY PART ON HELICOPTER |
| STILL PICTURE PROCESSING | SPECIFY PROCESSING METHOD (COMBINING STILL PICTURES, ESTIMATION OF BURNING AREA) |

F1, F2, · · · ·, F60:NTSC FIELD
B1, B2, · · · ·, B60:VERTICAL SYNC SIGNAL

FIG.19

| ITEM | CONTENTS |
|---|---|
| INSTRUCTION NO. | INSTRUCTION ID NO. |
| DATE | DATE OF SHOOTING |
| TIME | TIME OF SHOOTING |
| TYPE | SHOOTING PATTERN |
| POSITION OF SHOOTING | LATITUDE/LONGITUDE OF HELICOPTER DURING SHOOTING |
| ALTITUDE | ALTITUDE OF HELICOPTER DURING SHOOTING |
| STILL PICTURE SIZE | ACTUAL WIDTH OF STILL PICTURE |
| NUMBER OF STILL PICTURES | TOTAL NUMBER OF STILL PICTURES |
| NO. OF STILL PICTURES | NO. OF EACH STILL PICTURE |
| POSITION OF SHOOTING TARGET | LATITUDE/LONGITUDE OF THE CENTER OF EACH STILL PICTURE |
| ALTITUDE OF SHOOTING TARGET | ALTITUDE OF THE CENTER OF EACH STILL PICTURE |
| AZIMUTH OF CAMERA | AZIMUTH ANGLE<br>ANGLE OF DEPRESSION<br>ANGLE OF ROTATION |
| PARAMETERS OF VISIBLE-LIGHT CAMERA | USE/NONUSE<br>MAGNIFICATION<br>FILTER<br>GAIN |
| PARAMETERS OF INFRARED CAMERA | USE/NONUSE<br>MAGNIFICATION<br>FILTER<br>GAIN |

CURRENT POSITION

A: POSITION OF SHOOTING TARGET
B: SHOOTIGN DISTANCE
C: APPROACH PATH
D: STILL PICTURE MARKING POSITION
E: STANDBY AREA

FIG.25

| POSITION OF HELICOPTER 3 | PROCESSING BY PATH DISPLAY CONTROL PART 25 | PROCESSING BY SHOOTING CONTROL PART 27 | PROCESSING BY SHOOTING INFORMATION GENERATING PART 29 |
|---|---|---|---|
| BEFORE ENTERING STANDBY AREA E | DISPLAY FLIGHT PATH & CURRENT POSITION | SET TO DEFAULT STATE | — |
| STANDBY AREA E | DISPLAY FLIGHT PATH & CURRENT POSITION; DISPLAY FLYING ALTITUDE & SPEED | LOCK ON A (COORDINATES SETTING); SET CAMERA CONDITIONS INCLUDING ANGLE OF VIEW | — |
| STILL PICTURE MARKING POSITION D | DISPLAY FLIGHT PATH & CURRENT POSITION; DISPLAY FLYING ALTITUDE & SPEED | LOCK ON A (COORDINATES SETTING); SET CAMERA CONDITIONS INCLUDING ANGLE OF VIEW; OUTPUT STILL PICTURE MARKING INSTRUCTIONS 109; OUTPUT PROGRESS-OF-SHOOTING INFORMATION 110 | ADD STILL PICTURE MARK; GENERATE ASSOCIATED DATA 114 |
| POSITION A OF SHOOTING TARGET | DISPLAY FLIGHT PATH & CURRENT POSITION; DISPLAY FLYING ALTITUDE & SPEED | LOCK ON A (COORDINATES SETTING); SET CAMERA CONDITIONS INCLUDING ANGLE OF VIEW | — |

FIG.28

| POSITION OF HELICOPTER 3 | PROCESSING BY PATH DISPLAY CONTROL PART 25 | PROCESSING BY SHOOTING CONTROL PART 27 | PROCESSING BY SHOOTING INFORMATION GENERATING PART 29 |
|---|---|---|---|
| BEFORE ENTERING STANDBY AREA E | DISPLAY FLIGHT PATH & CURRENT POSITION | SET TO DEFAULT STATE | — |
| STANDBY AREA E [WPT(0)] | DISPLAY FLIGHT PATH & CURRENT POSITION; DISPLAY FLYING ALTITUDE & SPEED | LOCK ON D(1) (COORDINATES SETTING); SET CAMERA CONDITIONS INCLUDING ANGLE OF VIEW | — |
| STILL PICTURE MARKING POSITION D(1) | DISPLAY FLIGHT PATH & CURRENT POSITION; DISPLAY FLYING ALTITUDE & SPEE | OUTPUT STILL PICTURE MARKING INSTRUCTION 109; LOCK ON D(2) (COORDINATES SETTING); SET CAMERA CONDITIONS INCLUDING ANGLE OF VIEW | ADD STILL PICTURE MARK; GENERATE ASSOCIATED DATA 114 |
| ‥ | | | |
| STILL PICTURE MARKING POSITION D(4) | DISPLAY FLIGHT PATH & CURRENT POSITION; DISPLAY FLYING ALTITUDE & SPEED | OUTPUT OF STILL PICTURE MARKING INSTRUCTION 109; LOCK ON D(5) (COORDINATES SETTING); SET CAMERA CONDITIONS INCLUDING ANGLE OF VIEW | ADD STILL PICTURE MARK; GENERATE ASSOCIATED DATA 114 |
| ‥ | | | |
| STILL PICTURE MARKING POSITION D(8) | DISPLAY FLIGHT PATH & CURRENT POSITION; DISPLAY FLYING ALTITUDE & SPEED | OUTPUT STILL PICTURE MARKING INSTRUCTIONS 109; OUTPUT PROGRESS-OF-SHOOTING INFORMATION 110 | ADD STILL PICTURE MARK; GENERATE ASSOCIATED DATA 114 |

REMOTE-CONTROLLED SHOOTING SYSTEM, VIDEO CAMERA APPARATUS AND REMOTE-CONTROLLED SHOOTING METHOD

BACKGROUND OF THE INVENTION

1. Field of the Invention

The present invention relates to a remote-controlled shooting system, a video camera apparatus and a remote-controlled shooting method for shooting a disaster-stricken area from a helicopter or the like in response to an instruction from the ground.

2. Description of the Prior Art

To keep the damage to a minimum by an earthquake, fire, typhoon, tsunami or similar major disaster, it is absolutely necessary to grasp the situations in the stricken area quickly and accurately. FIG. 29 is a diagram depicting the general outlines of a conventional remote-controlled shooting system disclosed in Japanese Patent Laid-Open Gazette No. 10-257474. Reference numeral 7 denotes a ground base station which calls for the transmission of disaster information, and 8 a video camera apparatus loaded on, for example, a helicopter 9 to shoot the disaster area.

Reference character L1 denotes a first radio channel which is used to transmit speech signals between the ground base station 7 and the helicopter 9 or shooting instruction information to the video camera apparatus 8 and its response information; and L2 denotes a second radio channel which is used to transmit video signals from the video camera apparatus to the ground base station together with shooting conditions.

Upon occurrence of a major disaster, the ground base station 7 sends over the first radio channel L1 verbal instructions to the helicopter 9 as to the position of a target to be shot or the like and, at the same time, transmits shooting instruction information indicating the shooting conditions for the video camera apparatus 8, thereby remotely controlling it.

Having been instructed from the ground base station 7 on the position of the target to be shot and the shooting conditions, the video camera apparatus 8 shoot the specified spot in the stricken area from above, and transmits the video images to the base station 7 over the second radio channel L2. The ground base station 7 separates the received video images into moving and still images to monitor the scene of the disaster to grasp the situations. When the transmitted video images are not sufficient to grasp the disaster situations, verbal instructions are provided via the first radio channel while at the same time remotely controlling the video camera apparatus 8 to obtain new video images.

Since the conventional remote-controlled shooting system has such a configuration as mentioned above, the method which remotely controls the video camera apparatus 8 while monitoring video images and obtains new video signals may sometimes consume much time to accurately grasp the disaster situations according to the type and scale of the disaster and its temporal variations, making it impossible to quickly take appropriate measures.

Moreover, the load on the operator in the ground base station 7 is inevitably heavy, and video images are subject to individual operators' judgment, and hence vary according to the particular operator—this also constitutes an obstacle to accurately grasping the situations in the disaster-stricken area.

SUMMARY OF THE INVENTION

It is therefore an object of the present invention to provide a remote-controlled shooting system, a video camera apparatus and a remote-controlled shooting method in which a caller for disaster information selects an appropriate one of preset shooting patterns in accordance with the type, scale and temporal variation of the disaster to cope with, and sends a shooting instruction based on the selected shooting pattern and the shooting conditions corresponding thereto, or a shooting instruction based on the selected shooting pattern, to a video camera apparatus loaded on a helicopter, and in response to the shooting instruction, the video camera apparatus video images obtained by shooting a disaster area from above and transmit the disaster information to the caller, making it possible to quickly grasp the situations with high accuracy, while at the same time reducing the load on the operator of the caller and ensuring that the disaster information is not subject to the individual operators' judgment.

According to an aspect of the present invention, there is provided a remote-controlled shooting system which is provided with a video camera apparatus loaded on an aircraft, a shooting instruction device for sending a shooting instruction to said video camera apparatus over a radio channel, and an information display device for displaying the results of shooting by said video camera apparatus sent thereto over a radio channel. The shooting instruction device: responds to an operator's instruction to select a desired one of a plurality of prestored shooting patterns; inputs shooting conditions corresponding to said selected shooting pattern; and sends to said video camera apparatus a shooting instruction based on said selected shooting pattern or shooting instruction based on said selected shooting pattern and said input shooting conditions. The video camera apparatus: receives said shooting instruction from said shooting instruction device; make reference to map data and position/attitude information of said aircraft; based on said received shooting instruction, computes a sill picture marking position for extracting a still picture; makes a flight plan which satisfies said shooting instruction; based on said flight plan, display the flight path of said aircraft and shoots a shooting target; and adds a still picture mark to the video signal obtained at said still picture marking position, and sends a video signal with still picture mark and data associated with said shooting. The information display device: receives said video signal with still picture mark sent from said video camera apparatus; extracts said still picture from said video signal with still picture mark; and displays said still picture together with said associated data.

According to another aspect of the invention, said shooting instruction device comprises: a shooting pattern storage part with a plurality of shooting patterns stored therein; a first map data storage part with map data stored therein; a shooting instruction input part which selects one of said plurality of shooting patterns stored in said shooting pattern storage part in response to said operator's instruction, inputs said shooting conditions through use of said map data in said first map data storage part corresponding to said selected shooting pattern, and outputs said shooting instruction based on said selected shooting pattern, or said shooting instruction based on said selected shooting pattern and said input shooting conditions; and a shooting instruction transmitting part for sending said shooting instruction from said shooting instruction input part over a radio channel.

According to another aspect of the invention, said shooting pattern storage part has stored therein, as said plurality of shooting patterns, a plurality of basic shooting patterns and a plurality of model shooting patterns which are combinations of said basic shooting patterns.

According to another aspect of the invention, said shooting pattern storage part has stored therein, as one of said basic shooting patterns, a single-point shooting pattern for extracting one still picture at a point specified by some coordinates from a video image obtained by said video camera apparatus.

According to another aspect of the invention, said shooting pattern storage part has stored therein, as one of said basic shooting patterns, a multiple-point shooting pattern for extracting, at fixed time intervals, a plurality of still pictures at points specified by some coordinates from a video image obtained by said video camera apparatus.

According to another aspect of the invention, said shooting pattern storage part has stored therein, as one of said basic shooting patterns, a line shooting pattern for shooting a continuously stretching shooting target and for extracting a plurality of still pictures.

According to another aspect of the invention, said shooting pattern storage part has stored therein, as one of said basic shooting patterns, an area shooting pattern for shooting a wide shooting target area and for extracting a plurality of still pictures.

According to another aspect of the invention, said shooting pattern storage part has stored therein, as one of said basic shooting patterns, a spotlight shooting pattern for shooting a target from said aircraft flying around a spot specified on a map and for extracting a plurality of still pictures shot from different directions.

According to another aspect of the invention, said shooting pattern storage part has stored therein, as one of said basic shooting patterns, a panoramic shooting pattern for shooting a target from said aircraft hovering over its center while turning a camera and for extracting a plurality of still pictures shot from different directions.

According to another aspect of the invention, said video camera apparatus comprises: a shooting instruction receiving part for receiving said shooting instruction from said shooting instruction device; a second map data storage part with two- and three dimensional map data stored therein; a position/attitude detecting part for detecting the position/attitude information of said aircraft; a shooting planning part which: makes reference to map data in said second map data storage part and said position/attitude information detected by said position/attitude detecting part; based on said shooting instruction received in said shooting instruction receiving part, computes a still picture marking position for extracting a still picture; and makes a flight plan which satisfies said shooting instruction; a flight path display control part which makes reference to map data in said second map data storage part and said position/attitude information detected by said position/attitude detecting part, and creates flight path information of said aircraft based on said flight plan made by said shooting planning part; a flight path display part for displaying the flight path of said aircraft based on said flight path display information; a shooting control part which: makes reference to said position/attitude information of said aircraft detected by said position/attitude detecting part; based one said flight plan made by said shooting planning part, sets camera conditions and outputs camera control conditions; and outputs a still picture marking instruction for adding a still picture mark to said video signal obtained by shooting; a camera part for shooting a shooting target based on said camera control information and for outputting a video signal and associated shooting conditions; a shooting information generating part which, following said flight pan made by said shooting planning part, adds a still picture mark to said video signal from said camera part based on said still picture marking instruction from said shooting control part, then outputs a video signal with still picture mark, and outputs as said associated data said position/attitude information of said aircraft when said still picture mark was added and said shooting conditions from said camera part; and a shooting result transmitting part for sending over a radio channel said video signal with still picture mark and said associated data provided from said shooting information generating part.

According to another aspect of the invention, said shooting planning part comprises: a model shooting pattern storage part having stored therein a model shooting pattern and its shooting conditions, said model shooting pattern being a combination of basic shooting patterns; a shooting instruction decision part which: receives said shooting instruction and decides the shooting pattern instructed by said shooting instruction device; in the case of a basic shooting pattern, outputs said received shooting instruction intact; and in the case of a model shooting pattern, reads out each basic shooting pattern contained in said model shooting pattern stored in said model shooting pattern storage part and said shooting conditions corresponding thereto, and outputs them as said shooting instruction; a shooting instruction storage part for storing said shooting instruction provided from said shooting instruction decision part; a flight plan preparing part which: reads out said shooting instruction stored in said shooting instruction storage part; makes reference to said map data in said second map data storage part and said position/attitude information of said aircraft detected in said position/attitude detecting part; computes a still picture marking position for extracting a still picture; and makes a flight plan which satisfies said shooting instruction; a flight plan storage part for storing said flight plan made by said flight plan generating part; and a flight plan management part for reading out said flight plan stored in said flight plan storage part and outputs said read-out flight plan.

According to another aspect of the invention, when it has received a shooting instruction indicating the single-point shooting as the shooting pattern and the position of the shooting target and the still picture size as the shooting conditions, said flight plan preparing part obtains altitude data of said shooting target position from said map data in said second map data storage part, computes the shooting distance from said shooting target position which provides said still picture size, obtains the current position of said aircraft from said position/attitude information detected by said position/attitude detecting part, obtains an approach path of said aircraft from said current position of said aircraft and said shooting target position; obtains altitude data from said shooting target position to the position of said shooting distance on said approach path from said map data in said second map data storage part, and computes the intersection of the lowest altitude where said shooting target can be seen and said shooting distance on said approach path, thereby computing a still picture marking position.

According to another aspect of the invention, when it has received a shooting instruction indicating the line shooting as the shooting pattern and a plurality of way points and the still picture size as the shooting conditions, said flight plan preparing part computes each still picture marking position between said way points in a manner to provide overlapping of still pictures, obtains altitude data of said each still picture marking position from the map data in said second map data storage part, and calculates the flight altitude of said aircraft from the maximum altitude in said altitude data.

According to another aspect of the invention, when said shooting information generating part adds a still picture mark to the video signal from said camera part, said still picture mark is superimposed on a vertical sync signal in said video signal.

According to another aspect of the invention, said information display part comprises: a shooting result receiving part for receiving said video signal with still picture mark and said associated data from said video camera apparatus; a still picture extracting part for extracting said still picture from said video signal with still picture mark received -in said shooting result receiving part and for outputting said still picture together with said associated data; a database storage part for storing said still picture and said associated data output from said still picture extracting part; a third map data storage part for storing map data; and a shooting information display part which reads out said still picture and said associated data stored in said database storage part and display them on the map data read out of said third map data storage part.

According to another aspect of the invention, said still picture extracting part responds to said shooting instruction from said shooting instruction device to perform still picture processing such as joining together extracted still pictures or estimation of a burning area.

According to another aspect of the invention, there is provided a video camera apparatus which is loaded on an aircraft and shoots a shooting target in response to an external shooting instruction, said video camera apparatus comprising: a shooting instruction receiving part for receiving said shooting instruction sent over a radio channel; a map data storage part with two- and three dimensional map data stored therein; a position/attitude detecting part for detecting the position/attitude information of said aircraft; a shooting planning part which: makes reference to map data in said second map data storage part and said position/ attitude information detected by said position/attitude detecting part; based on said shooting instruction received in said shooting instruction receiving part, computes a still picture marking position for extracting a still picture; and makes a flight plan which satisfies said shooting instruction; a flight path display control part which makes reference to map data in said second map data storage part and said position/attitude information detected by said position/ attitude detecting part, and creates flight path information of said aircraft based on said flight plan made by said shooting planning part; a flight path display part for displaying the flight path of said aircraft based on said flight path display information; a shooting control part which: makes reference to said position/attitude information of said aircraft detected by said position/attitude detecting part; based one said flight plan made by said shooting planning part, sets camera conditions and outputs camera control conditions; and outputs a still picture marking instruction for adding a still picture mark to a video signal obtained by shooting; a camera part for shooting a shooting target based on said camera control information and for outputting a video signal and associated shooting conditions; a shooting information generating part which, following said flight pan made by said shooting planning part, adds a still picture mark to said video signal from said camera part based on said still picture marking instruction from said shooting control part, then outputs a video signal with still picture mark, and outputs as said associated data said position/attitude information of said aircraft when said still picture mark was added and said shooting conditions from said camera part; and a shooting result transmitting part for sending to the outside over a radio channel said video signal with still picture mark and said associated data provided from said shooting information generating part.

According to another aspect of the invention, said shooting planning part comprises: a model shooting pattern storage part having stored therein a model shooting pattern and its shooting conditions, said model shooting pattern being a combination of basic shooting patterns; a shooting instruction decision part which: receives said shooting instruction and decides the shooting pattern instructed by said shooting instruction device; in the case of a basic shooting pattern, outputs said received shooting instruction intact; and in the case of a model shooting pattern, reads out each basic shooting pattern contained in said model shooting pattern stored in said model shooting pattern storage part and said shooting conditions corresponding thereto, and outputs them as said shooting instruction; a shooting instruction storage part for storing said shooting instruction provided from said shooting instruction decision part; a flight plan preparing part which: reads out said shooting instruction stored in said shooting instruction storage part; makes reference to said map data in said second map data storage part and said position/attitude information of said aircraft detected in said position/attitude detecting part; computes a still picture marking position for extracting a still picture; and makes a flight plan which satisfies said shooting instruction; a flight plan storage part for storing said flight plan made by said flight plan generating part; and a flight plan management part for reading out said flight plan stored in said flight plan storage part and outputs said read-out flight plan.

According to another aspect of the invention, when it has received a shooting instruction indicating the single-point shooting as the shooting pattern and the position of the shooting target and the still picture size as the shooting conditions, said flight plan preparing part obtains altitude data of said shooting target position from said map data in said map data storage part, computes the shooting distance from said shooting target position which provides said still picture size, obtains the current position of said aircraft from said position/attitude information detected by said position/ attitude detecting part, obtains an approach path of said aircraft from said current position of said aircraft and said shooting target position; obtains altitude data from said shooting target position to the position of said shooting distance on said approach path from said map data in said map data storage part, and computes the intersection of the lowest altitude where said shooting target can be seen and said shooting distance on said approach path, thereby computing a still picture marking position.

According to another aspect of the invention, when it has received a shooting instruction indicating the line shooting as the shooting pattern and a plurality of way points and the still picture size as the shooting conditions, said flight plan preparing part computes each still picture marking position between said way points in a manner to provide overlapping of still pictures, obtains altitude data of said each still picture marking position from the map data in said map data storage part, and calculates the flight altitude of said aircraft from the maximum altitude in said altitude data.

According to another aspect of the invention, when said shooting information generating part adds a still picture mark to the video signal from said camera part, said still picture mark is superimposed on a vertical sync signal in said video signal.

According to another aspect of the invention, there is provided a remote-controlled shooting method comprising the steps of: (1) selecting a desired one of a plurality of prestored shooting patterns in response to an operator's instruction; (2) inputting shooting conditions corresponding to said selected shooting pattern in response to an operator's instruction; (3) outputting an shooting instruction based on said shooting pattern selected in said step (1), or a shooting instruction based on said shooting pattern selected in said step (1) and said shooting conditions input in said step (2); (4) sending said shooting instruction to an aircraft over a radio channel; (5) receiving said shooting instruction; (6) making reference to map data and position/attitude information of said aircraft, computing a still picture marking position for extracting a still picture based on said received shooting instruction, and making a flight plan which satisfies said shooting instruction; (7) displaying a flight path of said aircraft based on said flight plan; (8) shooting a shooting target; (9) adding a still picture to the resulting video signal to extract therefrom a still picture; (10) sending over a radio channel a video signal with said still picture mark and data associated with shooting; (11) receiving said video signal with said still picture mark and said associated data sent over said radio channel; (12) extracting a still picture from said video signal with said still picture mark; and (13) displaying said extracted still picture and said associated data.

According to another aspect of the invention, said plurality of preset shooting patterns in said step (1) are a plurality of basic shooting patterns and a plurality of model shooting patterns, each consisting of a combination of said basic shooting patterns.

According to another aspect of the invention, the said step (9) is a step of superimposing said still picture mark on a vertical sync signal of said video signal.

According to another aspect of the invention, said step (12) includes a step of performing still picture processing such as combining still pictures or estimation of a burning area in response to said shooting instruction.

BRIEF DESCRIPTION OF THE DRAWINGS

FIG. 14 is a table showing an example of the contents of a shooting instruction issued from a shooting instruction input part according to the embodiment of the present invention;

FIG. 19 is a table showing an example of the contents of associated data according to the embodiment of the present invention;

FIG. 25 is a table showing a flight plan for the single-point shooting formulated by the flight plan formulating part according to the embodiment of the present invention;

FIG. 28 is a table showing a flight plan for the line shooting formulated by the flight plan formulating part according to the embodiment of the present invention.

DETAILED DESCRIPTION OF THE PREFERRED EMBODIMENTS

Embodiment

Figures 1, 3:
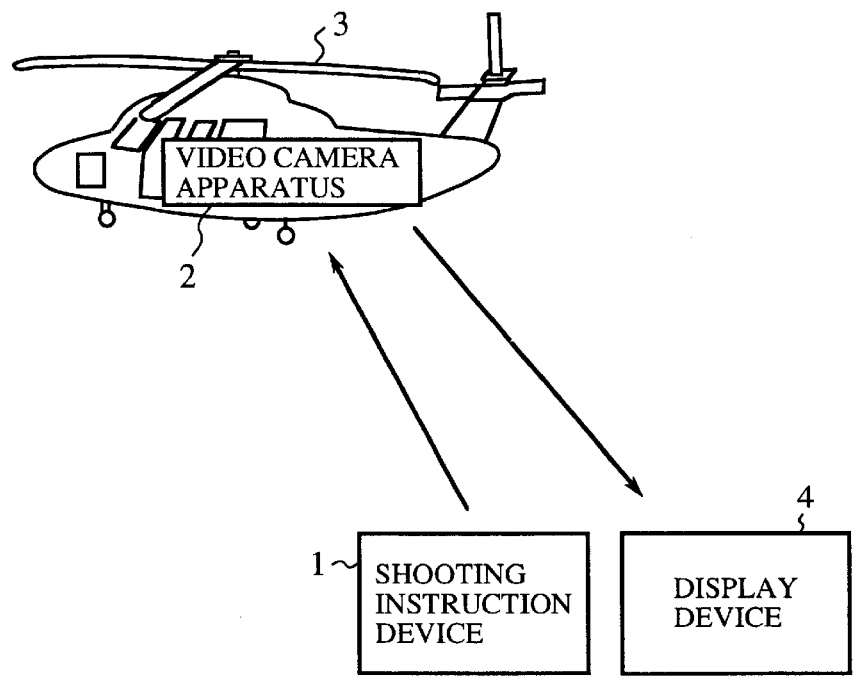
FIG. 1 is a schematic diagram for explaining the general outlines of a remote-controlled shooting system according to en embodiment of the present invention.
FIG. 3 is a table showing the kinds of shooting patterns stored in a shooting pattern storage part according to the embodiment of the present invention.

FIG. 1 is a diagrammatic sketch of a remote-controlled video-shooting system according to an embodiment of the present invention. Reference numeral 1 denotes a shooting instruction device located, for example, on the ground. The instruction device 1 selects a particular one of preset shooting patterns in accordance with the kind of disaster, inputs shooting conditions corresponding to the selected pattern, and sends over a radio channel shooting instructions based on the selected pattern or shooting instruction based on the selected shooting pattern and the input shooting conditions.

Figure 2:
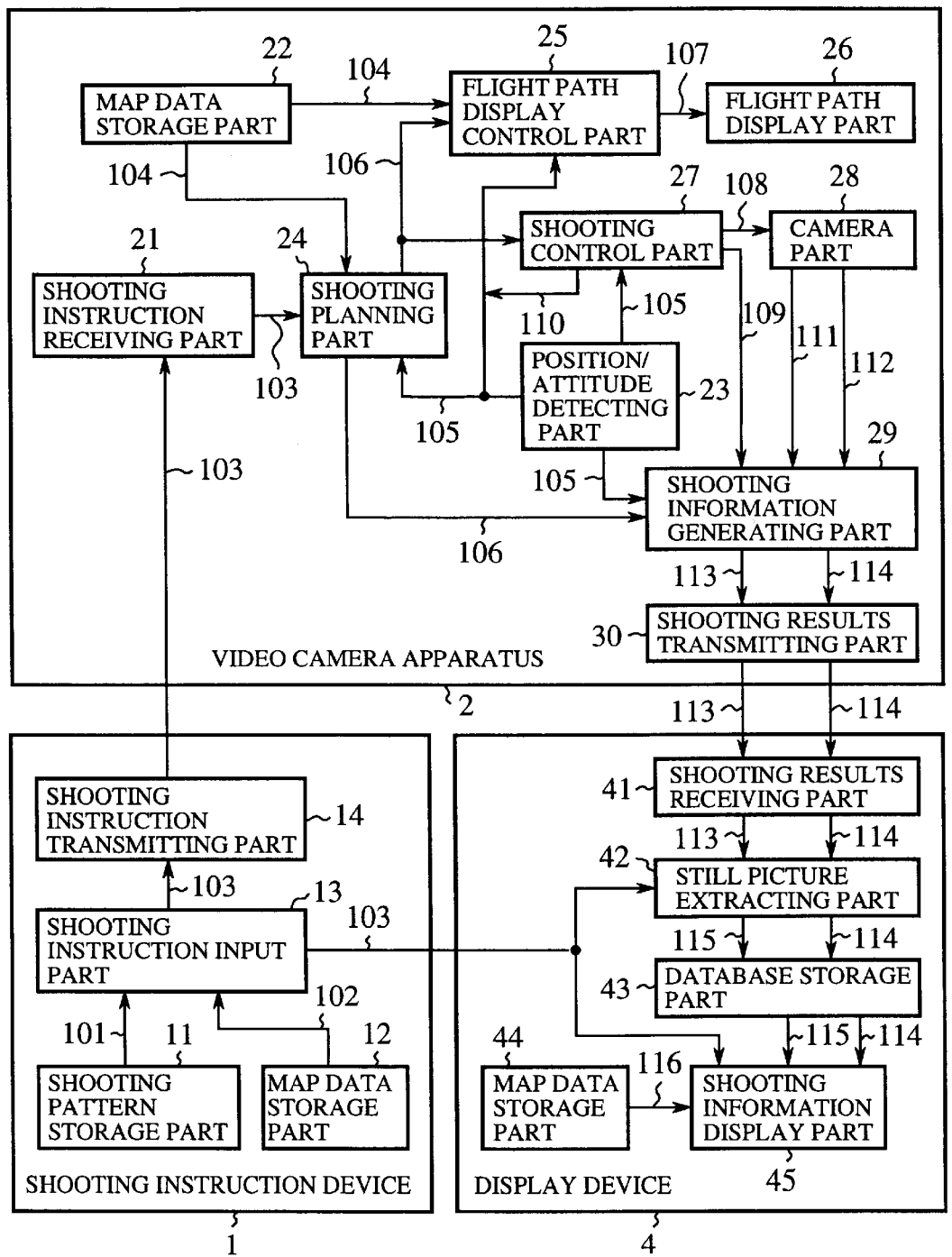
FIG. 2 is a block diagram depicting the configuration of the remote-controlled shooting system according to the embodiment of the present invention.

Reference numeral 2 denotes a video camera apparatus loaded, for example, on a helicopter (an aircraft) 3. The video camera apparatus 2 responds to the instruction from the shooting instruction device I to formulate a flight plan, shoot a video of a specified area in a stricken region (hereinafter referred to simply as a shooting target for the sake of simplicity), add a still picture mark to the video signals and send the video signals with the still picture mark over a radio channel together with associated data. Reference numeral 4 denotes an information display device which is located, for example, on the ground, extracts the still picture from the video signals sent from the video camera apparatus 2 and displays it along with the associated data FIG. 2 is a block diagram illustrating the configuration of the remote-controlled video-shooting system according to the embodiment of the present invention. The shooting instruction device 1 comprises: a shooting pattern storage part 11; a map data storage part (a first map data storage part) 12; a shooting instruction generating part 13; and a shooting instruction input part 14. In the shooting pattern storage part 11 there are prestored shooting patterns, a particular one of which is read out according to the type and scale of the disaster to cope with. In the map data storage part (a first map data storage part) 12 there is prestored two-dimensional map data 102.

In response to instructions from an operator, the shooting instruction input part 13 selects a particular one of the shooting patterns 101 stored in the shooting pattern storage part 11 according to the type and scale of the disaster, and inputs shooting parameters such as the position of a shooting target, the shooting range, the shooting direction, the selection of the camera to be used and various shooting parameters for the camera including the size of each still picture through utilization of the two-dimensional map data 102 read out of the map data storage part 12 in correspondence with the selected shooting pattern 101. The shooting instruction input part 13 provides to the shooting instruction transmitting part 14 shooting instructions 103 based solely on the selected shooting pattern 101 or on both of the shooting pattern 101 and the input shooting conditions.

The shooting instruction transmitting part 14 sends the shooting instructions 103 from the shooting instruction generating part 13 to the video camera apparatus 2 on the helicopter 3 over an analog or digital radio channel.

The video camera apparatus 2 comprises: a shooting instruction receiving part 21; a map data storage part (a second map data storage part) 22; a helicopter position/ attitude detecting part 23; a shooting planning part 24; a flight path display control part 25; a flight path display part 26; a shooting control part 27; a camera part 28; a shooting information generating part 29; and a shooting results transmitting part 30.

The shooting instruction receiving part 21 receives the shooting instructions 103 sent from the shooting instruction device 1. The map data storage part 22 has prestored therein two- and three-dimensional map data 104. The helicopter positioi/attitude detecting part 23 detects position/attitude information 105 such as the current position, altitude, attitude angle and flying speed of the helicopter 3 by means of a GPS (Global Positioning System) or gyro.

By reference to altitude data of the three-dimensional map data 104 read out of the map data part 22 and the position/ attitude information 105 on the helicopter 3 detected in the position/attitude detecting part 23, the shooting planning part 24 computes, based on the shooting instructions 103 received in the instruction receiving part 21, the flight path, flight altitude and flying speed of the helicopter 3, the position of a shooting target (latitude and longitude of the center of a still picture), the altitude of the shooting target (the altitude of the center of the still picture), a still picture marking position where to extract a still picture from video images being shot, and various other camera conditions including the camera angle of view corresponding to the still picture size. Based on the conditions thus computed, the shooting planning part 24 sets up a flight plan 106 that satisfies the instructions 103 sent from the shooting instruction device 1.

The flight path display control part 25 reads out of the map data storage part 22 the map data 104 corresponding to the flight plan 106 from the shooting planning part 24, and provides flight path display information 107 indicating the flight path and current position of the helicopter 3 by reference to the position/attitude information 105 of the helicopter 3 detected in the position/attitude detecting part 23. The flight path display part 26 displays the flight path and current position of the helicopter 3 based on the flight path display information 107 provided from the flight path display control part 25.

Based on the current position/attitude information 105 of the helicopter 3 from the position/attitude detecting part 23, the shooting control part 27 sets camera conditions for implementing the flight plan 106 provided from the shooting planning part 2, and outputs the camera conditions as camera control information 108 to the camera part 28. At the same time, the shooting control part 27 provides to the shooting information generating part 2 a still picture marking instruction 109 which instructs to make a still picture mark at the position defined by the flight plan 106. Upon each completion of the flight plan 106, the shooting control part 27 sends progress-of-shooting information 110 to the shooting planning part 24.

The camera part 28 responds to the camera control information 108 from the shooting control part 27 to shoot the specified target, and outputs video signals 111 and shooting conditions 112 under which the target was shot. The camera part 28 is provided with a visible-light camera, an infrared camera and so forth.

The shooting information generating part 29 responds to the still picture marking instruction 109 from the shooting control part 27 in correspondence with the flight plan 106 from the shooting planning part 24, and outputs a video signal 113 with still picture mark. At the same time, the shooting information generating part 29 provides, as associated data 114, the position/attitude information 105 and the shooting conditions 112 at the time the still picture mark was added.

The shooting result transmitting part 30 sends the video signals 113 with still picture mark from the shooting information generating part 29 to the information display device 4 over an analog radio channel. At the same time, the shooting result transmitting part 30 sends the associated data 114 from the shooting information generating part 29 to the display device 4 over a digital radio channel.

The information display device 4 comprises: a shooting results receiving part 41; a still picture extracting part 42; a database storage part 43; a map data storage part (a third map data storage part) 44; and 45 a shooting information display part.

The shooting results receiving part 41 receives the video signals with a still picture mark 113 and the associated data 114 sent from the shooting result transmitting part 30 of the video camera apparatus 2. The still picture extracting part 42 extracts a still picture from the video signals 113 and, if necessary, processes it by a still picture processing method specified by the shooting instructions 103 sent from the shooting instruction input part 13. The still picture 115 thus extracted and the associated data 114 are provided to the database storage part 43, wherein they are stored.

The map data storage part 44 has stored therein two-dimensional map data. The shooting information display part 45 reads out the still picture 115 and the associated data 114 from the database storage part 43, using as a readout address, for example, the shooting instruction ID number of the shooting instruction 103 from the shooting instruction input part 13 of the shooting instruction device 1, and displays them on the map data 116 read out of the map data storage part 44.

FIG. 3 is a table showing the kinds of shooting patterns 110 stored in the shooting pattern storage part 11 of the shooting instruction device 1. As shown, there are preset and prestored plural kinds of basic shooting patterns (P) and plural kinds of model shooting patterns (Q) that are combinations of the basic shooting patterns (p).

Figure 4:
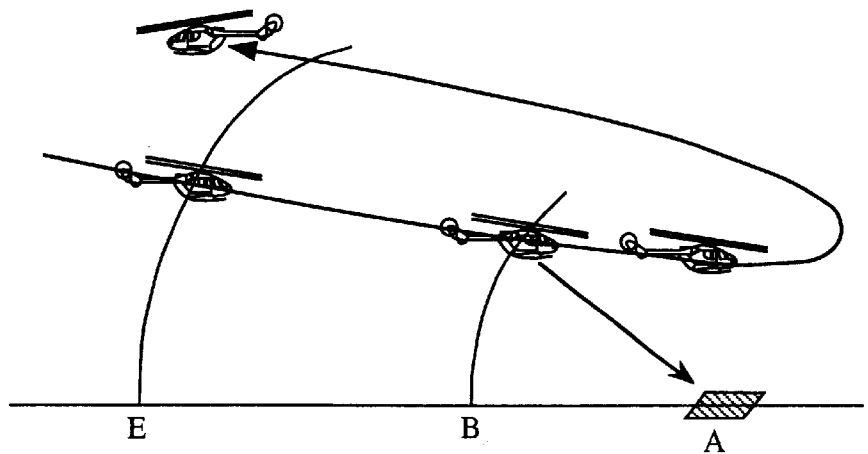
FIG. 4 is a conceptual diagram of single-point shooting according to the embodiment of the present invention.

FIG. 4 is a conceptual diagram of a single-point shooting scheme (P1). The single-point shooting scheme (P1) is to extract one still picture at a point specified by some coordinates from the video signals 113 so as to grasp disaster situations in a short time. In FIG. 4 a standby area E is a position on the flight path of the helicopter 3 toward the position A of the target to be shot; in the standby area E, preparations for shooting such as locking on the position A of the target are made and then shooting is started. A shooting-distance position B is a position where to add a still picture mark for extracting a still picture from the video being shot.

Figure 5:
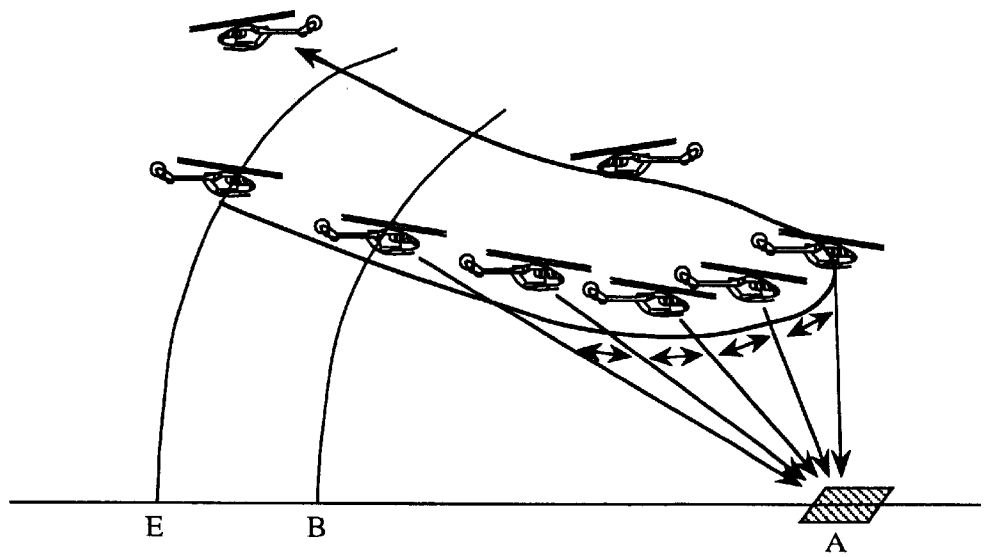
FIG. 5 is a conceptual diagram of multiple-point shooting according to the embodiment of the present invention.

FIG. 5 is a conceptual diagram of a multiple-point shooting scheme (P2). The multiple-point shooting scheme (P2) is to extract a plurality of still pictures at points specified by some coordinates from the video signals at fixed time intervals. This is intended to monitor the spread of disaster with the lapse of time. Reference characters A, B and C are common to those in FIG. 4.

Figure 6:
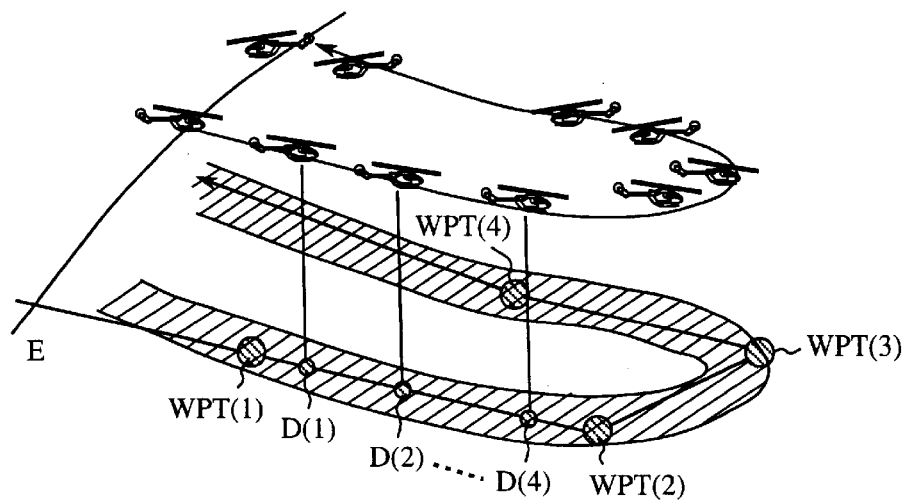
FIG. 6 is a conceptual diagram of line shooting according to the embodiment of the present invention.

FIG. 6 is a conceptual diagram of a continuous shooting scheme (P3). The continuous shooting scheme (P3) is to shoot a continuously stretching target such as a river or expressway from right above and extract a plurality of still pictures from the video images. This is intended to grasp disaster situations in such a long, continuously stretching target. Reference characters WPT(1), WPT(2), WPT(3) and WPT(4) denote specified way points of the helicopter 3; D(1), D(2), D(3), . . . , D(4) denote still picture marking positions; and E denotes a standby area of the helicopter 3.

Figure 7:
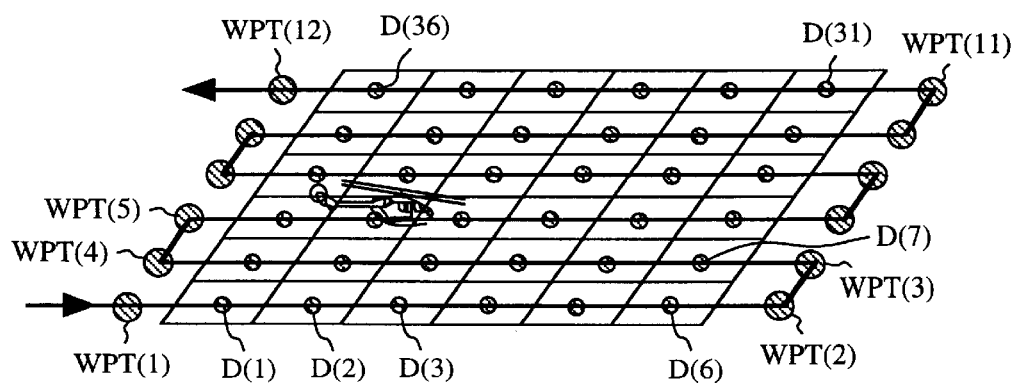
FIG. 7 is a conceptual diagram of area shooting according to the embodiment of the present invention.

FIG. 7 is a conceptual diagram of an area shooting scheme (P4). The area shooting scheme (P4) is to shoot a wide area, extract a plurality of still images and join them together into one still picture from which to judge disaster situations over a wide area or grasp detailed situations in a limited area. The flight path is so determined as to keep the total number of round-trip flights over the disaster-stricken area to a minimum, taking into account overlapping of adjacent still images. Reference characters WPT(1), WPT(2), WPT(3), . . . WPT(12) denote specified way points of the helicopter 3; and D(1), D(2), D(3), . . . , D(36) denote still picture marking positions.

Figure 8:
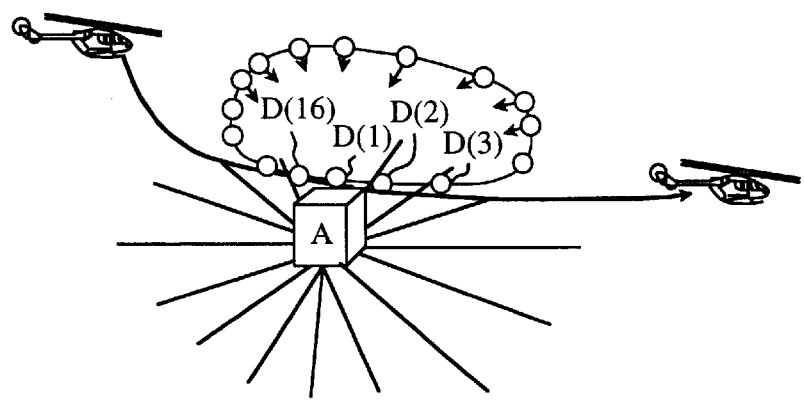
FIG. 8 is a conceptual diagram of spotlight shooting according to the embodiment of the present invention.

FIG. 8 is a conceptual diagram of spotlight shooting scheme (P5). The spotlight shooting scheme (P5) is to shoot a limited area, building or similar shooting target A from the helicopter 3 flying around a spot specified on the map and extract still pictures, for example, at 16 points on the flight path around the target A. Reference characters D(1), D(2), D(3), . . . , D(16) denote still picture marking positions.

Figure 9:
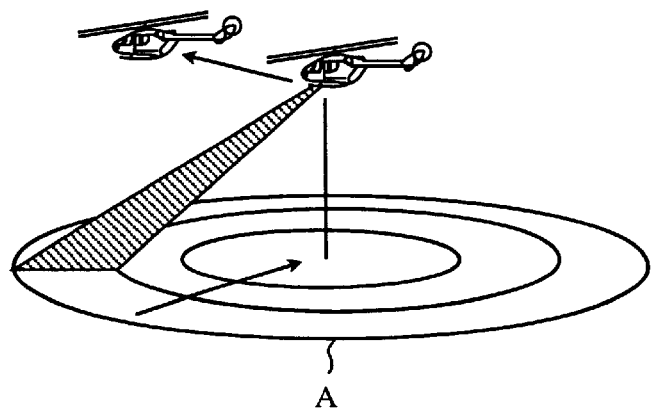
FIG. 9 is a conceptual diagram of panoramic shooting according to the embodiment of the present invention.

FIG. 9 is a conceptual diagram of panoramic shooting scheme (P6). This is intended to grasp disaster situations of a wide area immediately after the occurrence of a disaster by extracting a plurality of still pictures from video images obtained by shooting the target area from the helicopter 3 hovering over its center A while turning the camera part 28 or the helicopter 3 itself or both of them.

Figure 10:
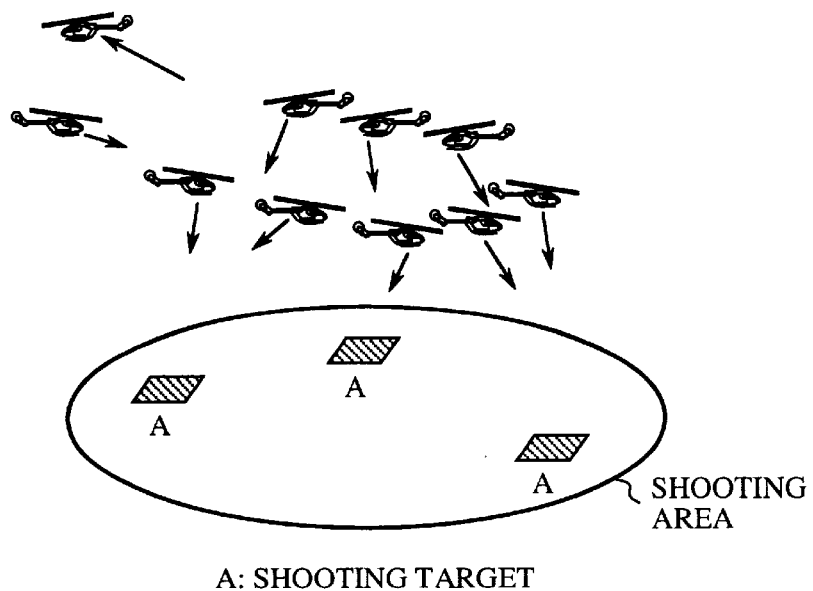
FIG. 10 is a conceptual diagram of free shooting according to the embodiment of the present invention.

FIG. 10 is a conceptual diagram of free shooting scheme (P7), which is intended for use when no particular spot of disaster is found. In this instance, only a shooting target area is specified and a cameraman on the helicopter 3 is allowed to shoot his arbitrarily selected target spots A within the specified area and designate still picture marking.

The model shooting pattern (Q) depicted in FIG. 3 is an arbitrary combination of the above-described basic shooting patterns (P). By preparing such combinations of basic patterns (P) and preset shooting conditions for each basic pattern (P), it is possible to reduce the load on an operator at the time of occurrence of a disaster and perform activity at the anti-disaster headquarters as predetermined.

Figure 11:
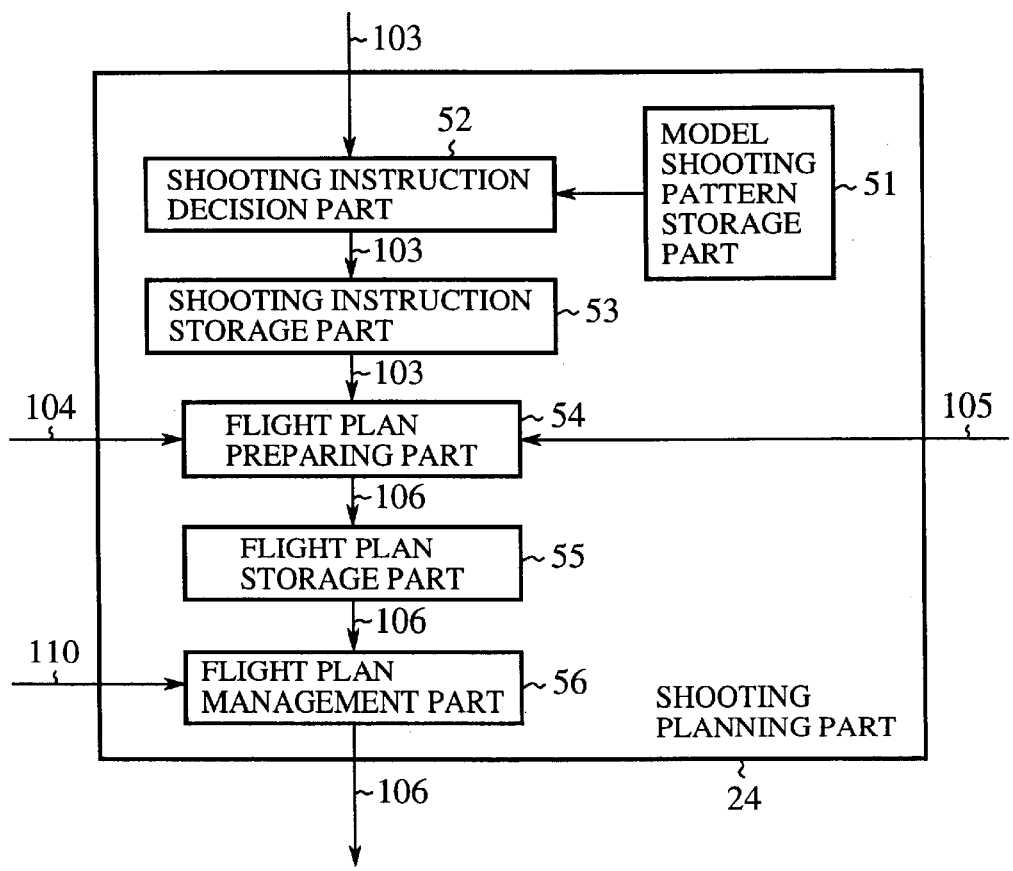
FIG. 11 is a block diagram depicting the internal configuration of a shooting planning part of a video camera apparatus according to the embodiment of the present invention.

FIG. 11 is a block diagram depicting the internal configuration of the shooting planning part 24 of the video camera apparatus 2. Reference numeral 51 denotes a model shooting pattern storage part in which there are prestored, for each basic shooting pattern (P) contained in the model shooting pattern (Q), a plurality of model shooting patterns (Q) and shooting conditions such as the position of the shooting target, the shooting range, the shooting direction, the selection of camera and various shooting parameters for camera including the still picture size.

Reference numeral 52 denotes a shooting instruction decision part that receives the shooting instruction 103 received by the shooting instruction receiving part 21 and decides the kind of the shooting pattern 101. When receiving the shooting pattern 101 is the basic shooting pattern (P), the shooting instruction decision part 52 outputs the basic shooting pattern (P) as received and the shooting instruction 103 corresponding to its shooting conditions, and in the case of the model shooting pattern (Q), the shooting instruction decision part 52 reads out of the model shooting pattern storage part 51 each basic shooting pattern (P) and each shooting condition contained in the model shooting pattern (Q), and outputs them as the shooting instruction 103.

Reference numeral 53 denotes a shooting instruction storage part in which to store the shooting instruction 103 provided from the shooting instruction decision part 52. Reference numeral 54 denotes a flight plan preparing part which reads out the shooting instruction 103 stored in the shooting instruction storage part 53 and refers to altitude data in the three-dimensional map data from the map data 22 and the position/attitude information 105 of the helicopter 3 detected in the position/attitude detecting part 23 to compute, based on the read-out shooting instruction 103, the flight path, flight altitude and flying speed of the helicopter 3, the position of the shooting target, the still picture marking position, and various camera conditions including the camera angle of view corresponding to the still picture size. Based on the results of computation, the flight plan preparing part 54 sets up the flight plan 106 that satisfies the shooting instruction 103.

In this instance, the flight plan preparing part 54 formulates the flight plan 106 for each specified basic shooting pattern (P). That is, in the case of the model shooting pattern (Q), the flight plan 106 is prepared for each of the basic shooting patterns contained in the model shooting pattern (Q).

Reference numeral 55 denotes a flight plan storage part in which to store the flight plan 106 prepared in the flight plan preparing part 54, and 56 a flight pan management part which reads out of one flight plan 106 from the flight plan storage part 55 and outputs it. In the case of the model shooting pattern (Q), the flight plan management part 56 reads out one flight plan 106 from the flight plan storage part 55 whenever it receives from the shooting control part 27 the progress-on-shooting information 110 indicating the end of the previous flight plan 106.

Next, the operation of this embodiment will be described below.

Figure 12:
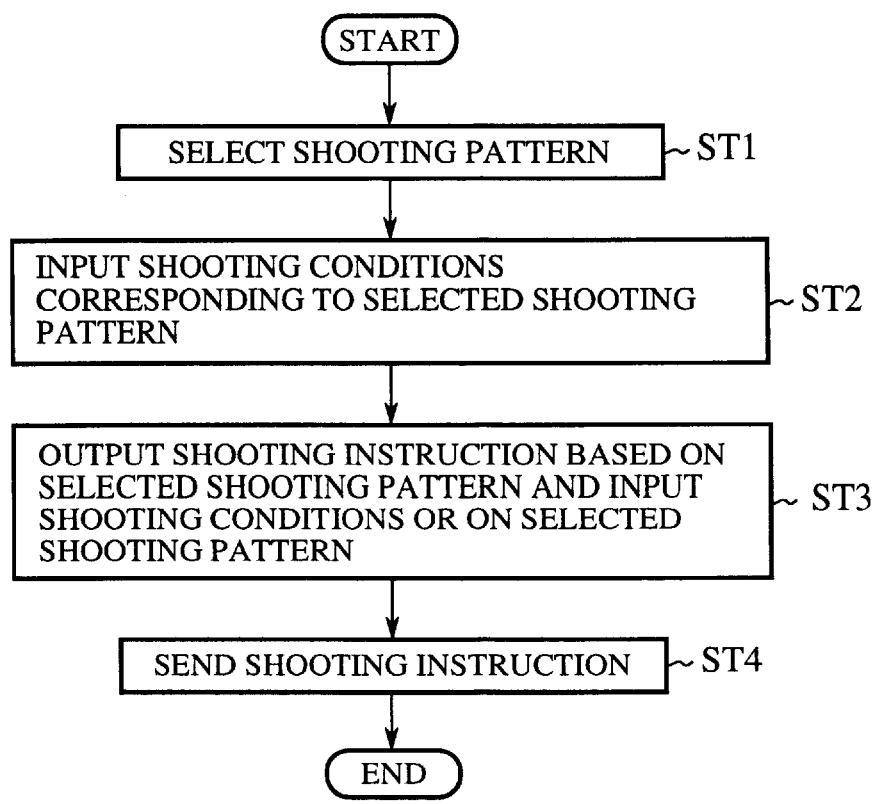
FIG. 12 is a flowchart showing the operation of a shooting instruction device according to the embodiment of the present invention.

FIG. 12 is a flowchart depicting the operation of the shooting instruction device 1. In step ST1 the shooting instruction input part 13 responds to an operator's instruction to input the shooting instruction ID number and the date and time of sending the shooting instruction and select one of the shooting patterns 101 in the shooting pattern storage part 11 according to the type and scale of the disaster to cope with.

In step ST2 the shooting instruction input part 13 reads out of the map data storage part 12 the two-dimensional map data corresponding to the selected shooting pattern 101, and input shooting conditions such as various shooting parameters for camera including the position of the shooting target, the shooting range, the kind of camera to be used and the still picture size. If necessary, the shooting instruction input part 13 inputs a message for a helicopter pilot which is displayed on the flight path display part 26 of the video camera apparatus 2 and a method for still picture processing which is performed in the still picture extracting part 42 of the information display device 4.

Incidentally, when the shooting pattern selected in step ST1 is the model shooting pattern (Q), the input of the shooting conditions in step ST2 is omitted because the shooting conditions for each basic shooting pattern (P) contained in the model shooting pattern (Q) are prestored in the model shooting pattern storage part 51 in the shooting planning part 24 of the video camera apparatus 2. This is intended to avoid the necessity for inputting enormous volumes of data representing all shooting conditions for the model shooting pattern and reduce such massive amount of data to be transmitted to the video camera apparatus 2.

Figure 13:
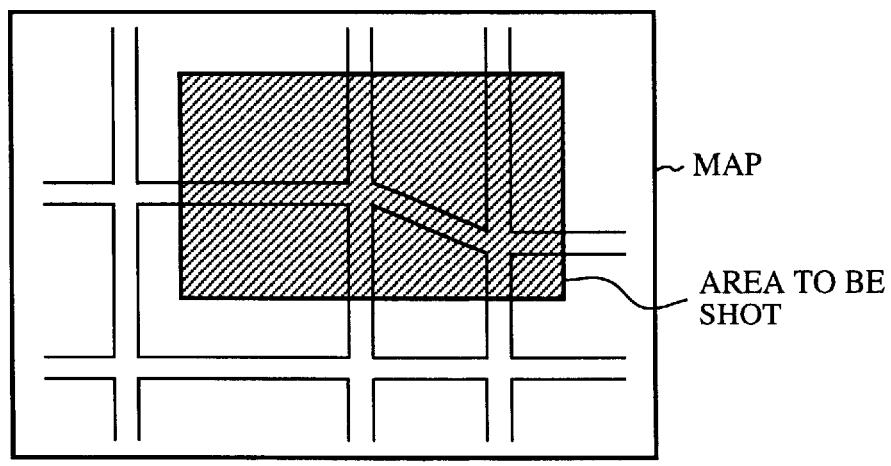
FIG. 13 is a diagram depicting an example of specifying the shooting range in the area shooting according to the embodiment of the present invention.

FIG. 13 is a diagram depicting an example of the designation of the range of shooting in the area shooting scheme (P4). As shown, the shooting instruction input part 13 inputs, as the range of shooting, a rectangular area on the map displayed using the map data 102.

The shooting conditions to be input differ with the shooting patterns depicted in FIG. 3. In the case of the multiple-point shooting scheme (P2), a predetermined time interval for extracting still pictures is added; in the cases of the continuous shooting scheme (P3) and the area shooting scheme (P4), the way points of the helicopter 3 are added; in the case of the spot shooting scheme (P5), predetermined directions for extracting still pictures are added; and in the cases of the panoramic shooting scheme (P6) and the free shooting scheme (P7), the radius of the shooting area is added.

In step ST3 in FIG. 12, when the model shooting pattern (Q) is selected, the shooting instruction input part 13 provides the shooting instruction 103 based on the selected shooting pattern 101 to the shooting instruction transmitting part 14 and the information display device 4. When the basic shooting pattern (P) is selected, the shooting instruction input part 13 the shooting instruction 103 based on the selected shooting pattern 101 and the input shooting conditions to the shooting instruction transmitting part 14 and the information display device 4.

FIG. 14 is a table showing an example of contents of the shooting instruction 103 provided from the shooting instruction input part 13. In the shooting instruction 103 there are contained shooting conditions including: the shooting instruction ID number, the date and time of transmitting the shooting instruction; the selected shooting pattern; the position of the shooting target indicated by latitude and longitude; the altitude for shooting, parameters for a visible-light or infrared camera; shooting parameters such as the actual still picture size; and a message and a still picture processing method which are displayed on the flight path display part 26.

In step ST4 in FIG. 12, the shooting instruction transmitting part 14 sends the shooting instruction 103 from the shooting instruction input part 13 over an analog or digital radio channel to the video camera apparatus 2 on the helicopter 3.

Figure 15:
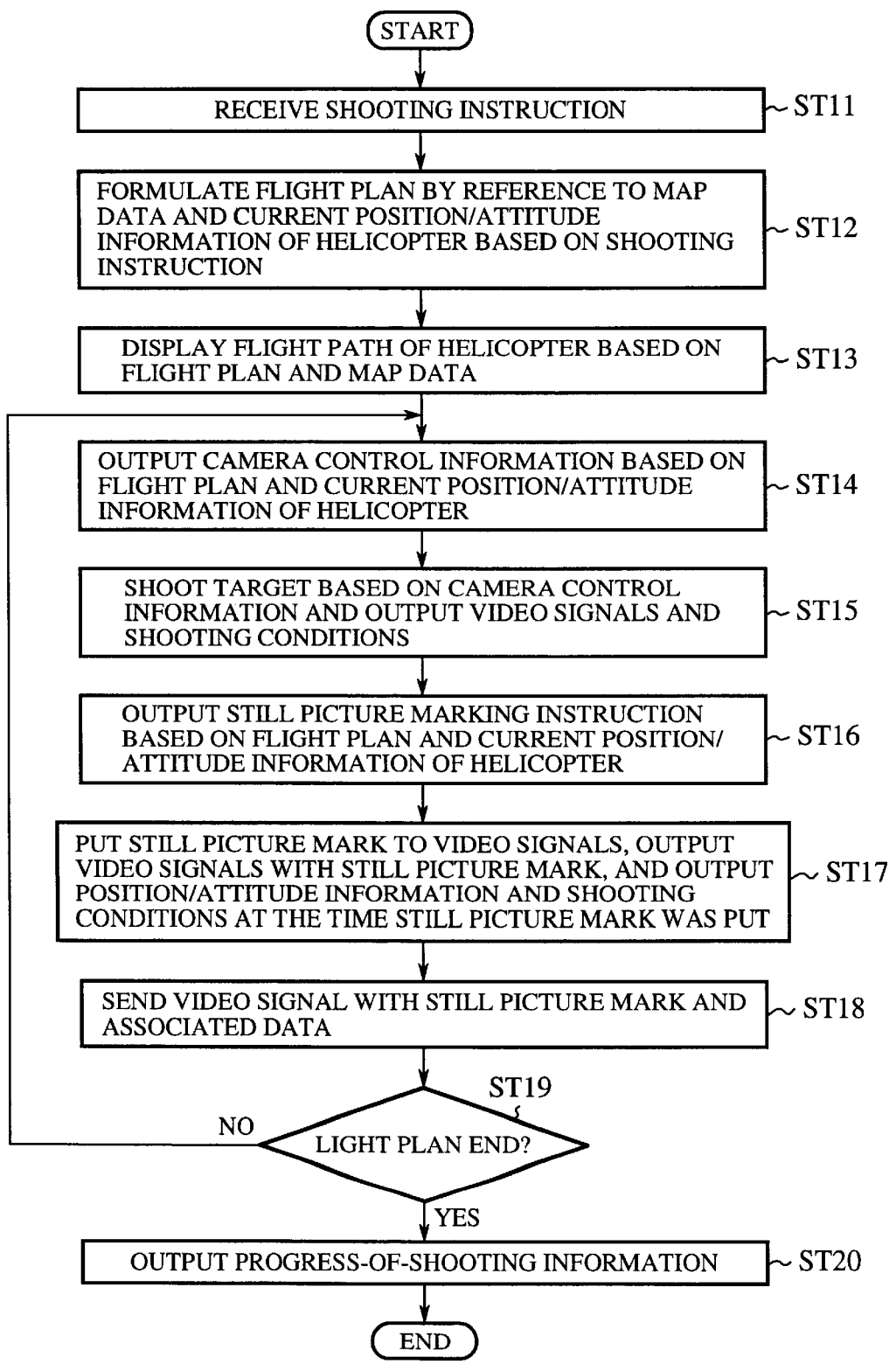
FIG. 15 is a flowchart showing the operation of the video camera apparatus according to the embodiment of the present invention.

FIG. 15 is a flowchart showing the operation of the video camera apparatus 2. In step ST11 the shooting instruction receiving part 21 receives the shooting instructions sent from the shooting instruction transmitting part 14 of the shooting instruction device 1 over the analog or digital radio channel.

In step ST 12 the shooting planning part 24 responds to the shooting instructions 21 fed from the shooting instruction receiving part 21 to compute, by reference to altitude data in the three-dimensional map data 104 read out of the map data storage part 22 and the position/attitude information 105 of the helicopter 3 detected in the position/attitude detecting part 23, the flight path, flight altitude and flying speed of the helicopter 3, the position and altitude of the shooting target, the still picture marking position and various camera conditions including the camera angle of view corresponding to the designated still picture size which satisfy the shooting instruction 103 received in the shooting instruction receiving part 21. Then the shooting planning part 24 formulates the flight plan 106 containing the shooting instruction ID number. The position/attitude detecting part 23 always detects the position/attitude information 105 such as the current position, altitude, attitude angle and flying speed of the helicopter 3 by means of GPS or gyro.

Figure 16:
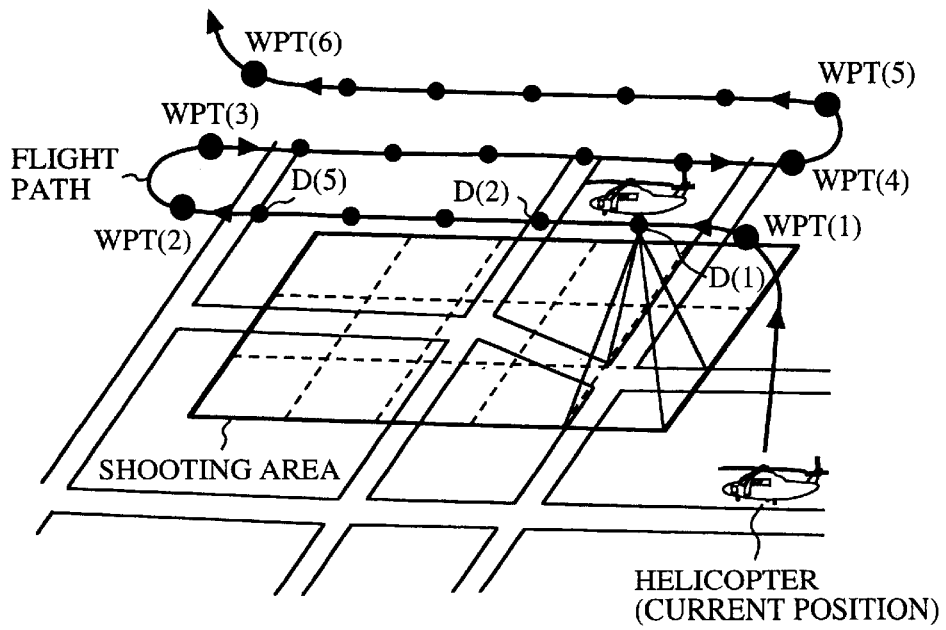
FIG. 16 is a diagram for explaining a flight plan for the area shooting formulated in the shooting planning part according to the embodiment of the present invention.

FIG. 16 is a diagram for explaining the flight plan 106 for the area shooting scheme (P4) created by the shooting planning part 24. As shown, the still picture marking positions D(1), D(2), . . . , the camera direction and the camera angle of view are computed with respect to the specified shooting range and the way points WPT(1), WPT(2), . . . of the helicopter 3.

In step ST12 in FIG. 15, when the shooting instruction 103 received in the shooting instruction receiving part 21 is directed to the model shooting pattern (Q), the instruction 103 does not contain any shooting conditions such as the position of the shooting target, the shooting range, the camera to be used and various shooting parameters including the still picture size; hence, the shooting planning part 24 formulates the flight plan 106 containing the shooting instruction ID number based on predetermined shooting conditions which are preset and prestored.

In step ST13 the flight path display control part 25 reads out of the map data storage part 22 the map data 204 corresponding to the flight plan 106 provided from the shooting planning part 24, and generates the flight path display information 107 indicating the flight path of the helicopter 3 and its current position. Based on the flight path display information 107 provided from the flight path display control part 25, the flight path display part 26 displays the flight path and current position of the helicopter 3. The pilot flies the helicopter 3 along the flight path on the display.

Figure 17:
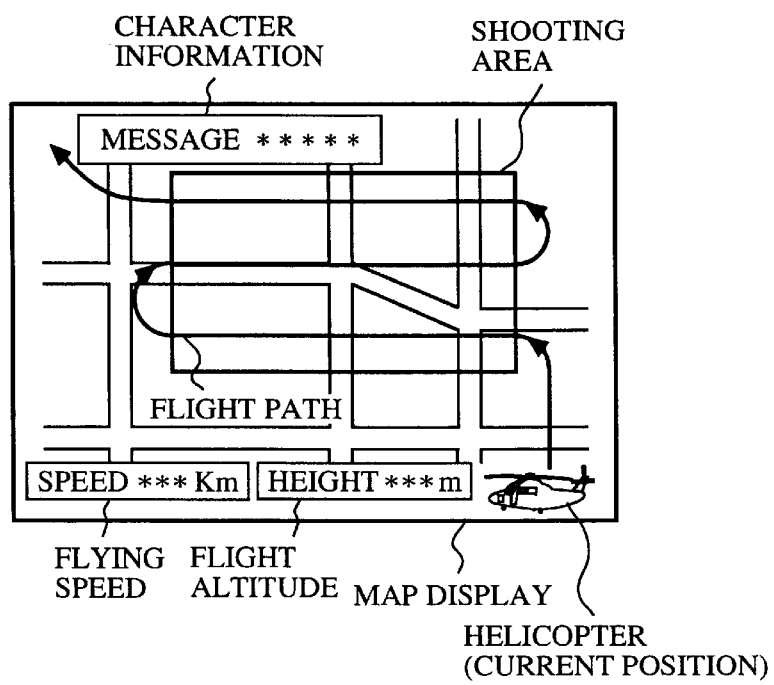
FIG. 17 is a diagram depicting an example of a display in a flight path display part in the area shooting according to the embodiment of the present invention.

FIG. 17 is a diagram showing an example of a display that is provided by the flight path display part 26. On the map derived from the map data 104 there are displayed the flight path and current position of the helicopter 3. The flight altitude and flying speed may also be displayed, and when a message is contained in the shooting instruction 103 depicted in FIG. 14, its character information may be displayed as well.

In step ST14 in FIG. 15, based on the current position/attitude information 105 of the helicopter 3 provided from the position/attitude detecting part 23, the shooting control part 27 sets various camera conditions for implementing the flight plan 106 from the shooting planning part 24, and outputs them as the camera control information 108 to the camera part 28.

In step ST15, based on the camera control information 108 from the shooting control part 27, the camera part 28 uses the visible-light or infrared camera to shoot the target, and outputs the resulting video signal 111 and the shooting condition 112 to the shooting information generating part 29.

In step ST16, based on the position/attitude information 105 from the position/attitude detecting part 23, the shooting control part 27 outputs to the shooting information generating part 29 the still picture marking instruction 109 which instructs the addition of the still picture mark for extracting a still picture from the video signals 111 at the position defined by the flight plan 106.

In step ST17, based on the flight plan 106 containing shooting instruction ID number provided from the shooting planning part 24 and the still picture marking instruction 109 from the shooting control part 27, the shooting information generating part 29 adds the still picture mark to the video signals 111 from the camera part 28 and outputs to the shooting result transmitting part 30 the video signals 113 with still picture mark. At the same time, the position/attitude information 105 provided from the position/attitude detecting part 23 at the time of the still picture marking and the shooting condition 112 from the camera part 28 are provided as the associated data 114 to the shooting result transmitting part 30. At this time, the shooting instruction ID number is contained in the associated data 114.

Figure 18:
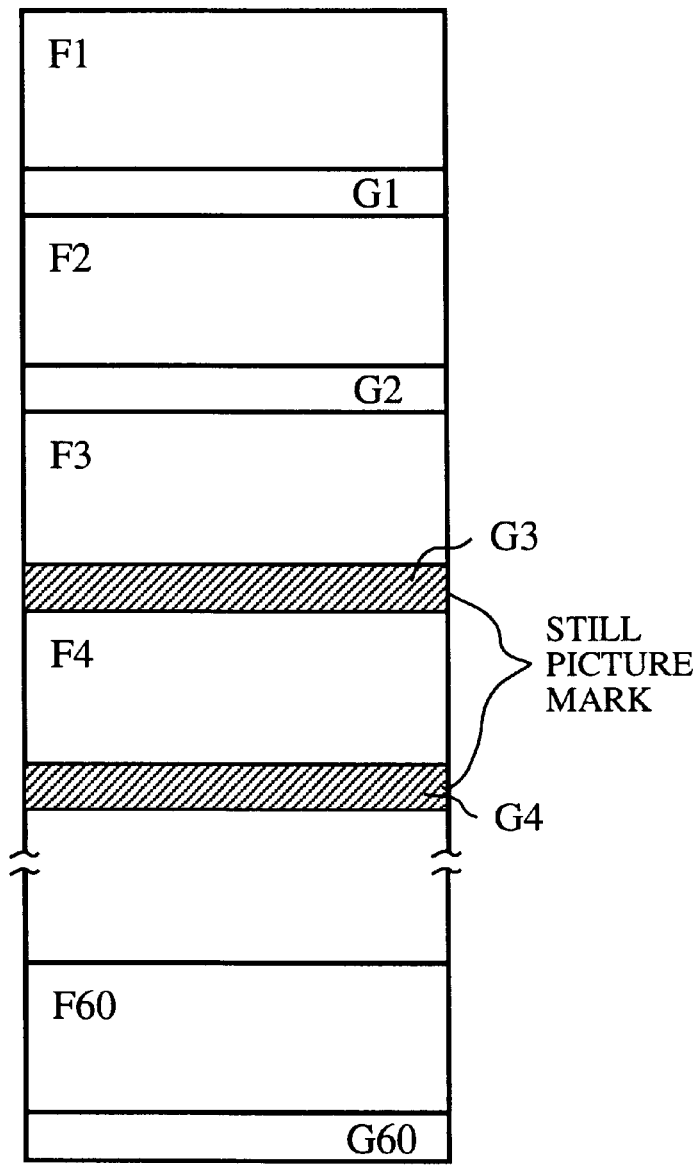
FIG. 18 is a diagram for explaining how to add still picture mark according to the embodiment of the present invention.

FIG. 18 is a diagram for explaining how to add the still picture mark to the video signals. Reference characters F1, F2, . . . , F60 denote NTSC (National Television System Committee) fields, and G1, G2, . . . , G60 vertical sync signals. The video signals 111 consist of 60 NTSC fields per sec. The shooting information generating part 29 superimposes the still picture mark on the vertical sync signal of each NTSC field.

For example, when still picture marks are superimposed on the vertical sync signals G3 and G4, the NTSC fields F3 and F4 are extracted as still pictures. Incidentally, in the case of extracting the NTSC fields F3 and F4, the still picture mark need not always be superimposed on both of the vertical sync signals G3 and G4 but it may be superimposed on either one of them.

FIG. 19 is a diagram showing an example of the contents of the associated data 114. In the data 114 there are contained, as shown, the shooting instruction ID number, the data and time of shooting, the shooting pattern, the position and altitude of the helicopter 3 during shooting, the still picture size, the total number of still pictures, the numbers of the still pictures, the position of the shooting target indicated by the latitude and longitude of the center of each still picture, the altitude of the shooting target indicating the altitude of the center of each still picture, the camera direction and parameters for the visible-light camera and the infrared camera.

In step ST18 the shooting result transmitting part 30 sends the video signals 113 with still picture marks from the shooting information generating part and the associated data 114 to the information display device 4 over an analog radio channel and a digital radio channel, respectively. In this instance, the associated data 114 may be multiplexed on the analog radio channel over which the video signals 113 are sent.

In step ST19 the shooting control part 27 makes a check to see if one flight plan 106 has ended, and if not, the video camera apparatus 2 repeats the processes of steps ST14 to ST18. That is, in the case of the model shooting pattern (Q), the processes from the step ST14 to ST18 are performed a plurality of times for each basic shooting pattern (P) contained in the model shooting pattern (Q).

Having confirmed the completion of one flight plan 106 in step ST19, the shooting control part 17 outputs the progress-of-shooting information 110 to the shooting planning part 24.

Figure 20:
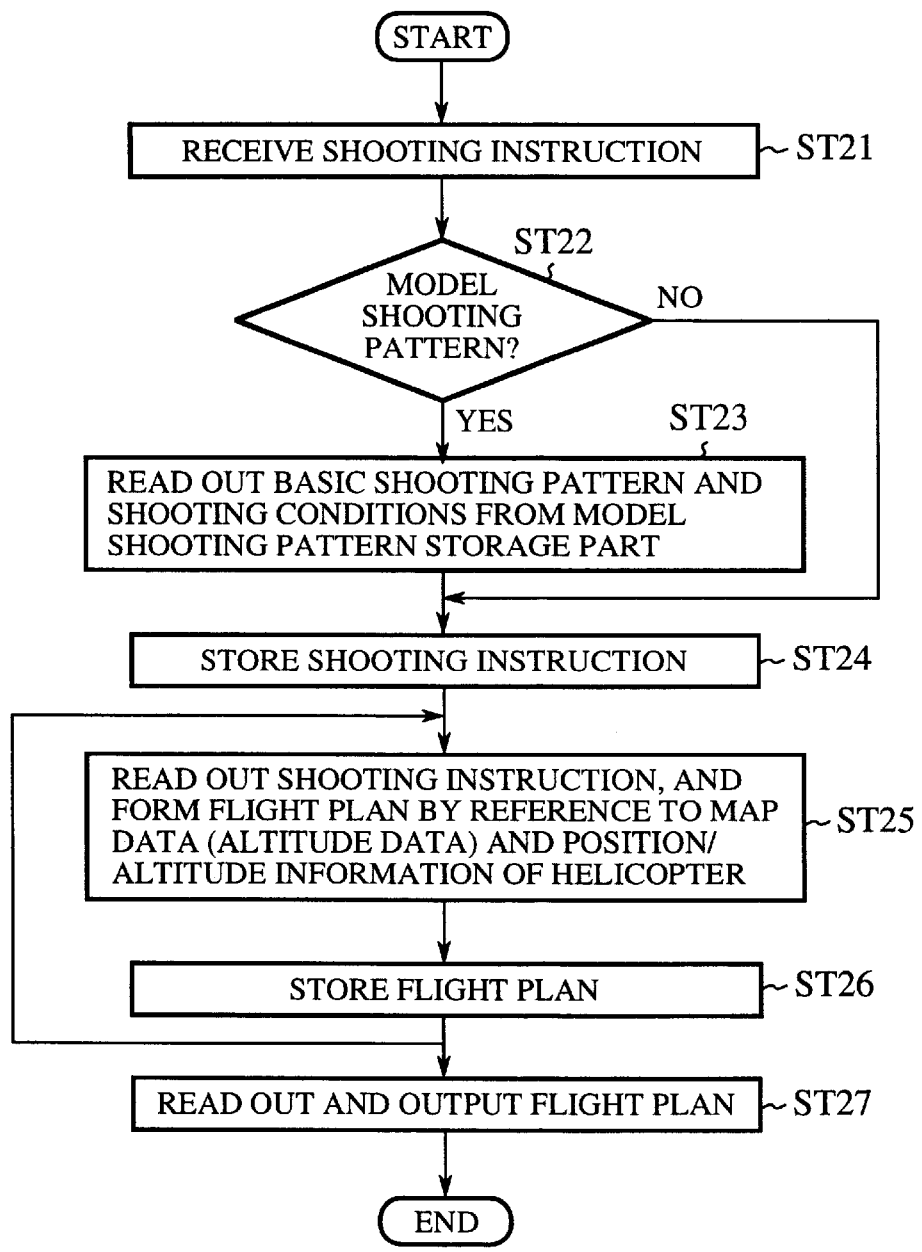
FIG. 20 is a flowchart showing the operation of the shooting planning part according to the embodiment of the present invention.

FIG. 20 is a flowchart showing the process of the shooting planning part 24. The shooting instruction decision part 52 receives, in step ST21, the shooting instructions 103 received in the shooting instruction receiving part 21 and, in step ST22, makes a check to see if the shooting pattern contained in the received shooting instruction 103 is the model shooting pattern (Q).

When it is found in step ST22 that the shooting pattern contained in the shooting instruction 103 is the model shooting pattern (Q), the shooting instruction decision part 52 reads out, in step ST23, each basic shooting pattern (P) contained in the model shooting pattern (Q) and its shooting condition, as the shooting instruction 103, from the model shooting pattern storage part 51 and, in step ST24, stores the shooting instruction 103 in the shooting instruction storage part 53.

When it is found in step ST22 that the shooting pattern contained in the shooting instruction 103 is the basic shooting pattern (P), the shooting instruction decision part 52 outputs the received instruction intact since the shooting condition is also sent from the shooting instruction device 1, and in step ST24 the decision part 52 stores the instruction 103 in the shooting instruction storage part 53.

In step ST25 the flight plan preparing part 54 reads out the shooting instruction 103 from the shooting instruction storage part 53 and compute, by reference to the altitude data of the three-dimensional map data 104 from the map data storage part 22 and the position/attitude information 105 of the helicopter 3 detected by the position/attitude detecting part 23, the flight path, flight altitude and flying speed of the helicopter, the position and altitude of the shooting target, still picture marking positions for extracting still pictures from the video being shot, and various camera conditions including the camera angle of view corresponding to each still picture size which satisfy the shooting instruction 103 read out of the storage part 53. Based on such results of computation, the flight plan preparing part 54 formulates the flight plan 106.

In step ST26 the flight plan 106 thus made by the flight plan preparing part 54 is stored in the flight plan storage part 55. In the case of the model shooting pattern (Q), the flight plan preparing part 54 repeatedly performs steps ST25 and ST26 by the same number of times as the basic shooting patterns contained in the model shooting pattern (Q) to make a plurality of flight plans and stores them in the flight plan storage part 55.

In step ST27 the flight plan management part 56 reads out one flight plan 106 from the flight plan storage part 55 and outputs it. In the case of the model shooting pattern (Q), there are stored a plurality of flight plans 106 in the storage part 55; hence, whenever receiving from the shooting control part 27 the progress-of-shooting information 110 indicating the completion of one flight plan 106, the flight plan management part 56 reads out the next flight plan 106 from the flight plan storage part 55 and outputs it.

Figure 21:
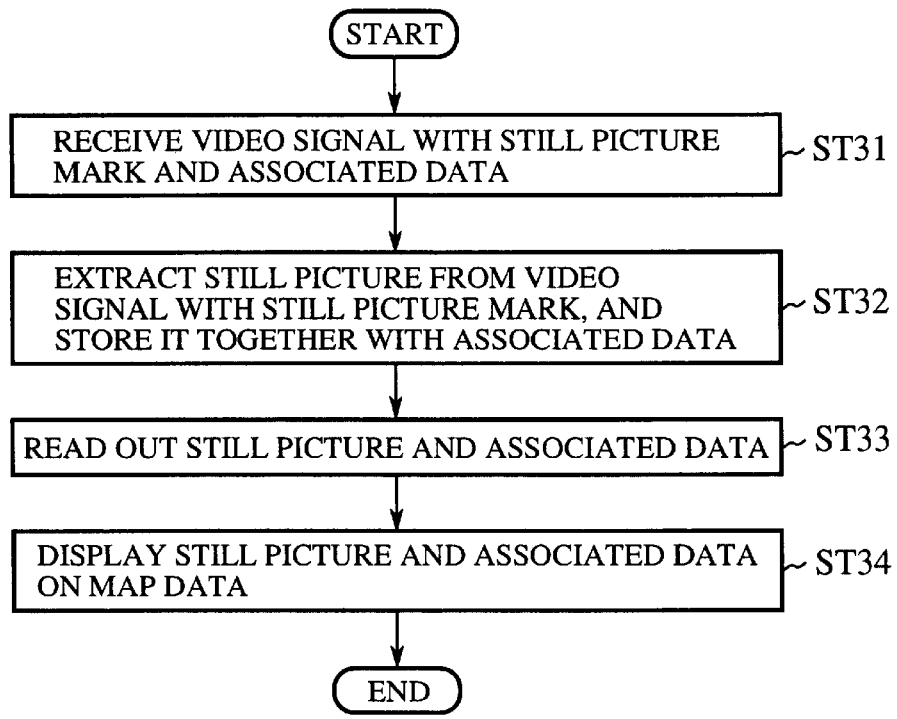
FIG. 21 is a flowchart showing the operation of an information display part according to the embodiment of the present invention.

FIG. 21 is a flowchart depicting the operation of the information display device 4. In step ST31 the shooting result receiving part 41 receives the video signals 113 with still picture marks sent over the analog radio channel from the shooting result transmitting part 30 and the associated data 114 sent over the digital radio channel.

In step ST32 the still picture extracting part 42 extracts still pictures 115 from the video signals 113 by detecting therein the still picture marks, then outputs the extracted still pictures together with the associated data 114, and stored them in the database storage part 43, using the shooting instruction ID number in the associated data 114 as a memory address.

Figure 22:
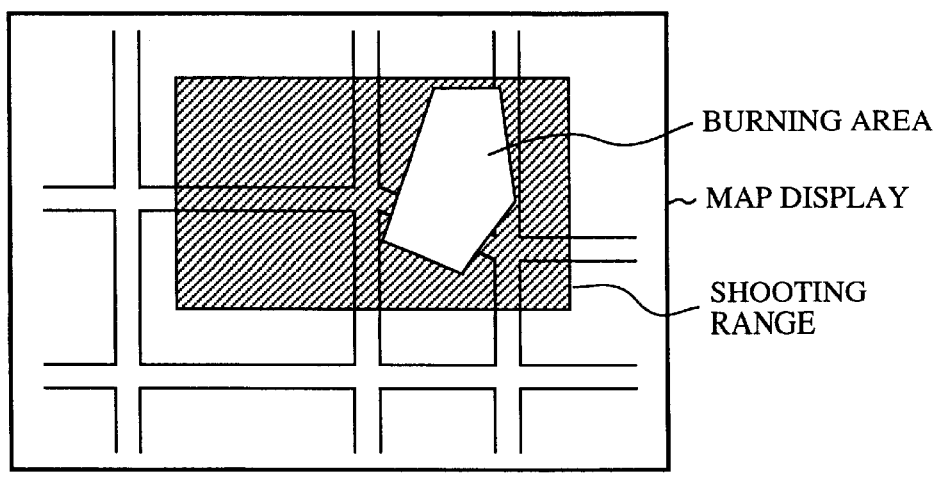
FIG. 22 is a diagram for explaining still picture processing for the estimation of a burning area according to the embodiment of the present invention.

When the shooting instruction 103 sent from the shooting instruction input part 13 contains instructions for still picture processing such as joining of the still pictures or the estimation of a burning area, the still picture extracting part 42 processes the extracted still pictures accordingly. FIG. 22 is a diagram for explaining the still picture processing for the estimation of a burning area. To make this estimation, use is made of still pictures from the infrared camera as well as from the visible-light camera.

In step ST33 the shooting information display part 45 responds to an operator's instruction to read out of the still pictures 115 and the associated data 114 from the database storage part 43 using as a readout address, for example, the shooting instruction ID number contained in the shooting instruction sent from the shooting instruction input part 13.

In step ST34 the shooting information display part 45 displays the read-out still pictures 115 and associated data 114 on the map data 116 read out of the map data storage part 44.

Next, a detailed description will be given of the single-point shooting (P1) depicted in FIG. 4.

In the case of instructing the single-point shooting (P1) in the shooting instruction device 1, the shooting instruction input part 13 responds to an. operator's instruction to select the single-point shooting (P1) from the shooting pattern storage part 11 in step ST1, and in step ST2 the shooting instruction input part 13 responds to an operator's instruction to input shooting conditions such as the position of the shooting target, the choice of cameras and various shooting parameters for camera including the still picture size. In steps ST3 and ST4 the shooting instruction 103 is sent to the video camera apparatus 2.

In the video camera apparatus 2 the shooting instruction 103 sent thereto is stored in the shooting instruction storage part 53 of the shooting planning part 24 through the processes of steps ST21 to ST24 depicted in FIG. 20.

Figure 23:
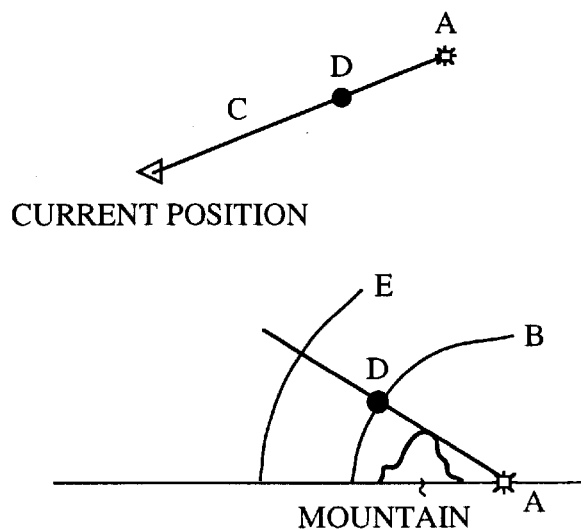
FIG. 23 is a diagram for explaining the process of a flight plan formulating part in the single-point shooting according to the embodiment of the present invention.

FIG. 23 is a diagram for explaining the process by the flight plan preparing part 54 of the shooting planning part 23. Reference character A denotes the position of the shooting target, B a shooting distance from the position A which provides the designated still picture size, C an approach path of the helicopter 3, D a still picture marking position, and E a standby area.

Figure 24:
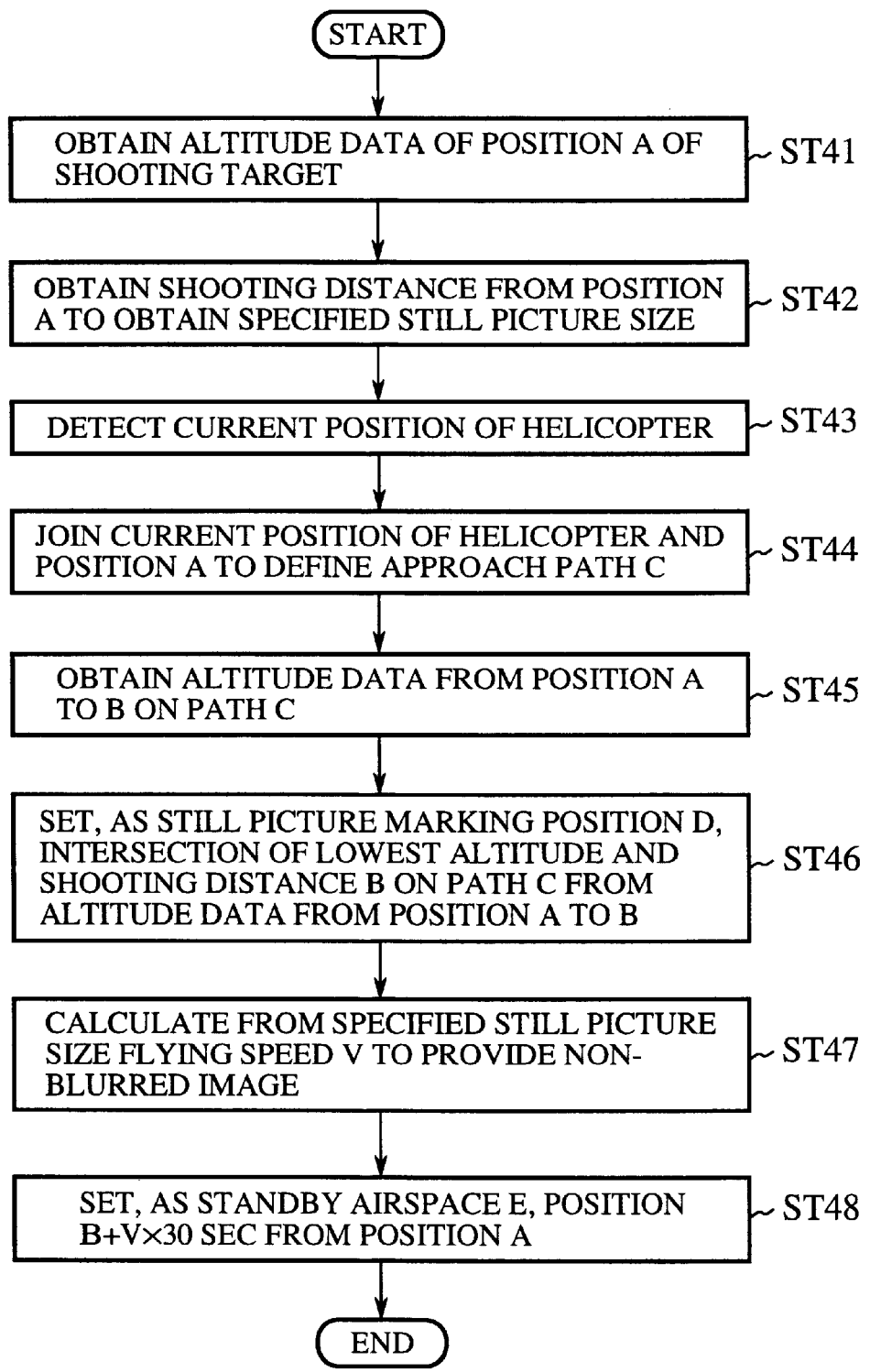
FIG. 24 is a flowchart showing the operation of the flight plan formulating part for defining a helicopter standby area and a still picture marking position in the single-point shooting according to the embodiment of the present invention.

FIG. 24 is a flowchart showing the procedure by which the flight plan preparing part 54 obtains the holding airspace E and the still picture marking position D. In step ST41 the flight plan preparing part 54 obtains altitude data of the position A from the map data 104 stored in the map data storage part 22. In step ST42 the flight plan preparing part 54 computes the shooting distance B from the position A which provides the designated still picture size.

In step ST43 the flight plan preparing part 54 obtains the current position of the helicopter 3 from the position/attitude information 105 provided from the position/attitude control part 23 and, in step ST44, joins the current position of the helicopter 3 and the position A of the shooting target to define the approach path of the helicopter 3. In step ST45 the flight plan preparing part 54 obtains altitude data over the shooting distance B from the position A of the shooting target on the approach path C from the map data 104 read out of the map data storage part 22.

In step ST46 the flight plan preparing part 54 uses altitude data from the position A of the shooting target to the shooting-distance point B to define, as the still picture marking position D, the intersection of the lowest altitude at which the shooting target can be seen and the shooting-distance point B. In step ST47 the flight plan preparing part 54 computes from the specified still picture size the flying speed V of the helicopter 3 at which video images are not blurred, and in step ST48 it defines the position at a distance (shooting distance B+flying speed V×30 sec) from the position A as the standby area E.

The flight plan preparing part 54 formulates the flight plan 106 based on the standby area E and the still picture marking position D, and stores it in the flight plan storage part 55. FIG. 25 is a table showing the flight plan 106 made by the flight plan preparing part 54, in which there are listed processes that the flight path display control part 25, the shooting control part 27 and the shooting information generating part 29 perform corresponding to the position of the helicopter 3.

For example, when the helicopter has not yet flown into the standby area E, the flight path control part 25 controls the display of the flight path and current position of the helicopter 3 by the flight path display information 107, and the shooting control part 27 provides the camera control information 108 to the camera part 28 to set it in a default state, for example, turning it right downward.

When the helicopter 3 is in the standby area E, the flight path display control part 25 provides the flight path display information 107 to the flight path display part 26 to control the display of the flight path and current position of the helicopter 3 and the display of its flight altitude and flying speed. Further, the shooting control part 27 provides the camera control information to the camera part 28 to perform coordinate setting for locking the camera part 28 on the position A of the shooting target, set various camera conditions including the camera angle of view which satisfies the designated still picture size and cause the camera part 18 to start shooting.

When the helicopter 3 is at the still picture marking position D, the flight path display control part 25 effects, by the flight path display control information 107, the display control as in the case of the standby area E. The shooting control part 27 performs, by the camera control information 108, the same setting as in the case of the standby area E, and provides the still picture marking instruction 109 to the shooting information generating part 29, thereafter outputting the progress-on-shooting information 110 to the shooting planning part 24. Further, the shooting information generating part 29 adds still picture marks to the video signals 111 from the camera part 28, and creates the associated data 114 based on the position/attitude information 105 provided from the position/attitude detecting part 23 when the still picture marks were added and the shooting information 112 from the camera part 28.

When the helicopter 3 is above the position A of the shooting target, the flight path display control part 25 effects the same display control as in the case of the standby area E, and the shooting control part 27 also performs the same setting as in the case of the standby area E.

The flight plan management part 56 of the shooting planning part 24 reads out the flight plan 106 from the flight plan storage part 55 and provides it to the flight path display control part 25, the shooting control part 27 an the shooting information generating part 29, by which the flight plan 106 shown in FIG. 25, that is, the specified single-point shooting (P1) is implemented and a desired still picture can be extracted in the information display device 4.

Next, a detailed description will be given of the continuous shooting (P3) shown in FIG. 6.

In the case of instructing the continuous shooting (P) by the shooting instruction device 1, the shooting instruction input part 13 responds to an operator's instruction to read out the continuous shooting (P3) from the shooting pattern storage part 11 in step ST1 in FIG. 12, and in step ST12 the shooting instruction input part 13 responds to an operator's instruction to input shooting conditions such as the way points WPT(n), the choice of camera and various shooting parameters for camera including the still picture size. And in steps ST3 and ST4 the shooting instruction 103 is sent to the video camera apparatus 2.

In the video camera apparatus 2 the shooting instruction 103 sent thereto is stored in the shooting instruction storage part 53 of the shooting planning part 24 in steps ST21 to ST24.

Figure 26:
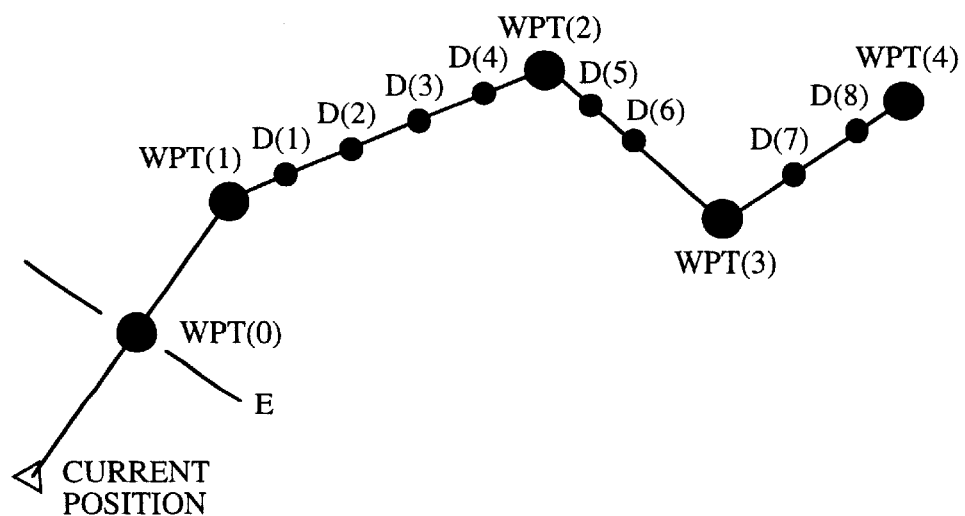
FIG. 26 is a diagram for explaining the process of the flight plan formulating part of the shooting planning part in the line shooting according to the embodiment of the present invention.

FIG. 26 is a diagram for explaining the process of the flight plan preparing part 54 in the shooting planning part 24. Reference characters WPT(1), WPT(2), WPT(3) and WPT(4) denote specified way points; D(1), D(2), ..., D(4) denote still picture marking positions; E denotes a standby area; and WPT(0) denotes a way point which is the intersection of a line joining the current position and the way point WPT(1) of the helicopter 3 and the standby area E.

Figure 27:
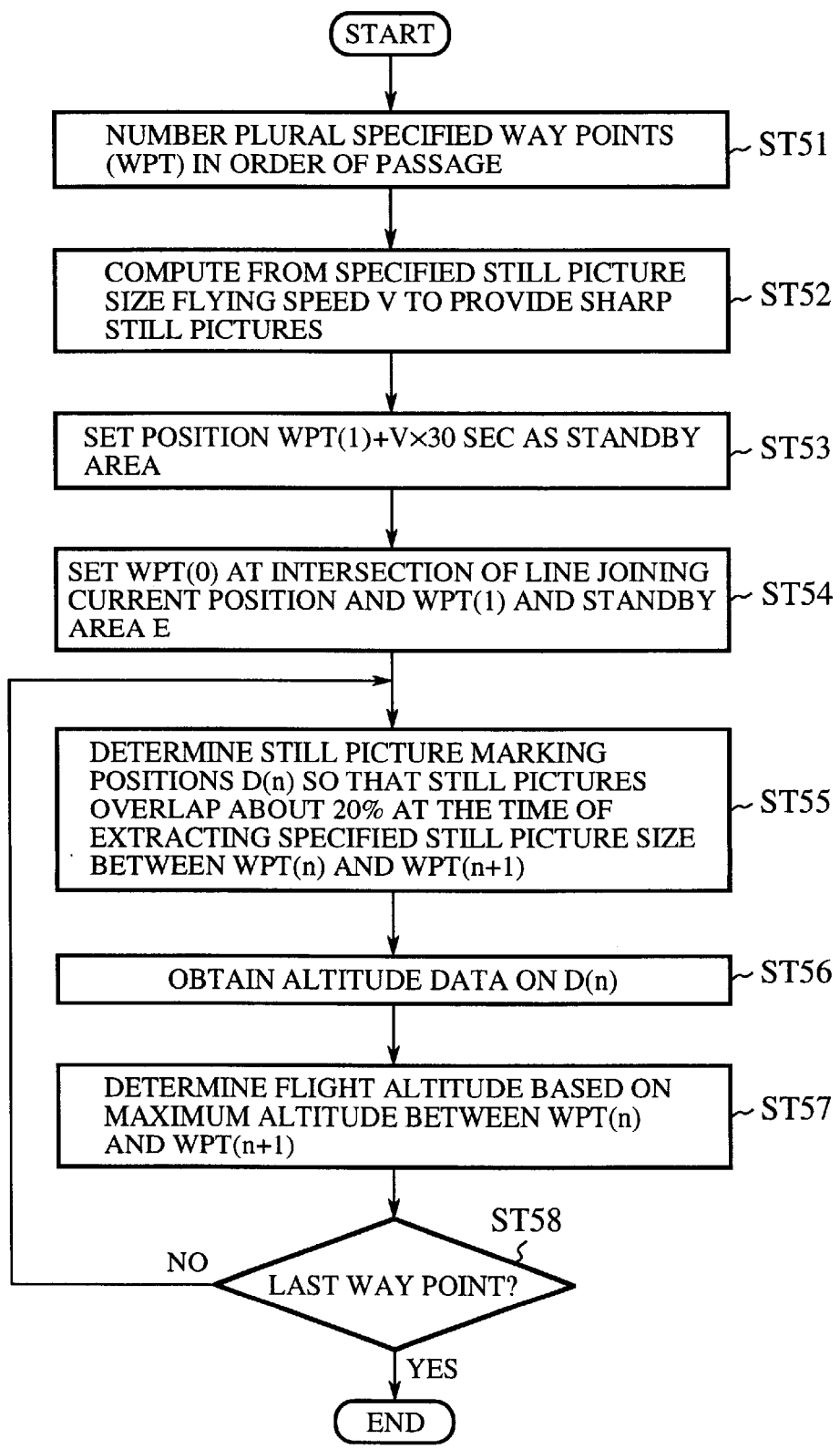
FIG. 27 is a flowchart depicting the procedure by which the flight plan formulating part defines the helicopter standby area, way points and the still picture marking positions in the line shooting according to the embodiment of the present invention.
Figure 29:
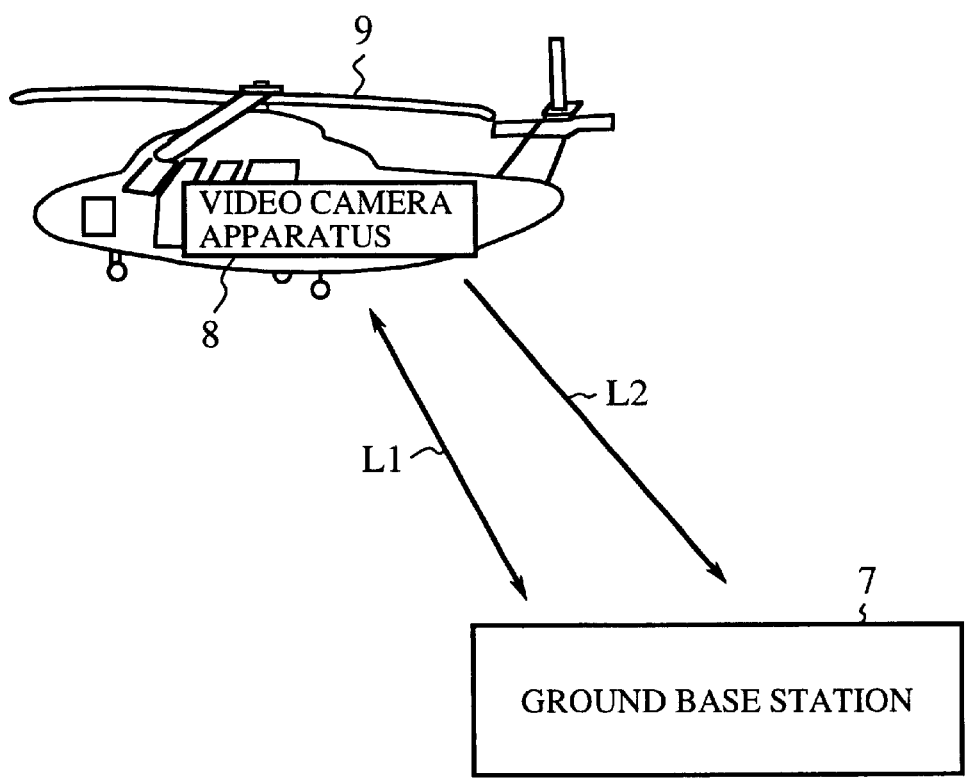
FIG. 29 is a diagram depicting the general outlines of a conventional remote-controlled shooting system.

FIG. 27 is a flowchart showing the procedure by which the flight plan preparing part 54 obtains the standby area E, the way point WPT(0) and the still picture marking positions D(n). In step ST51 the flight plan preparing part 54 numbers the specified plural way points WPT(n) in the order of passage.

In step ST52 he flight plan preparing part 54 computes from the specified still picture size the flying speed V of the helicopter 3 which does not cause the image to appear blurred and, in step ST52, defines the position (way point WPT(1)+flying speed V×30 sec) to be standby area E and, in step ST54, defines the intersection of the line joining the current position of the helicopter 3 and the way point WPT(1) and the standby area E to be the way point WPT(0).

In step ST55 the flight plan preparing part 54 determines the still picture marking positions D(n) between the way points WPT(1) and WPT(2) so that extracted still pictures overlap about 20% of their entire area. The 20% overlapping accommodates variations in the accuracy of the shooting position caused by shaking of the position/attitude detecting part 23 or camera part 28, and this is also intended to facilitate combining of the still pictures.

In step ST56 he flight plan preparing part 54 obtains altitude data of the still picture marking position D(n) from the map data 104 in the map data storage part 22, and in step ST57 it determines the flight altitude of the helicopter 3 from the maximum altitude between the wap points WPT(1) and WPT(2). This computation of the flight altitude is conducted when the shooting target hidden behind a mountain or building.

In step ST58 the flight plan preparing part 54 repeats the processes of steps ST55 to ST57 so as to determine the still picture marking positions D(n) and the flight altitude of the helicopter 3 until the specified last way point is reached.

Based on the still picture marking positions D(n) and the flight altitude of the helicopter 3 thus obtained, the flight plan preparing part 54 formulates the flight plan 106 and stores it in the flight plan storage part 55. FIG. 28 is a table depicting the flight plan 106 made by the flight plan preparing part 54, wherein there are shown processes that the flight path display control part 25, the shooting control part 27 and the shooting information generating part 29 perform corresponding to the position of the helicopter 3.

For example, when the helicopter has not yet reached the standby area E, the flight path control part 25 controls the display of the flight path and current position of the helicopter 3 by the flight path display information 107, and the shooting control part 27 provides the camera control information 108 to the camera part 28 to set it in a default state, for example, turning it right downward.

When the helicopter 3 is -in the standby area E [WPT(0)], the flight path display control part 25 provides the flight path display information 107 to the flight path display part 26 to control the display of the flight path and current position of the helicopter 3 and the display of its flight altitude and flying speed as well. Further, the shooting control part 27 provides the camera control information 108 to the camera part 28 to perform coordinate setting for locking the camera part 28 on the position A of the shooting target, set various camera conditions including the camera angle of view which satisfy the designated still picture size and cause the camera part 18 to start shooting.

When the helicopter 3 is at the still picture marking position D(1), the flight path display control part 25 effects, by the flight path display control information 107, the same display control as in the case of the standby area E[WPT(0)]. The shooting control part 27 outputs the still picture marking instruction 109 to the shooting information generating part 29, after which it performs, by the camera control information 108, the coordinate setting for locking the camera on the still picture marking position D(2) and sets various camera conditions including the angle of view which satisfy the specified still picture size. Further, the shooting information generating part 29 adds still picture marks to the video signal 111 from the camera part 28, and creates the associated data 114 based on the position/attitude information 105 provided from the position/attitude detecting part 23 when the still picture mark was added and the shooting information 112 from the camera part 28.

When the helicopter 3 is at the last still picture marking position D(4) between the way points WPT(1) and WPT(2), the flight path display control part 25 effects the same display control as in the case of the standby area E by the flight path display control information 107, and the shooting control part 27 outputs the still picture marking instruction 109 to the shooting information generating part 29, after which it performs, by the camera control information 108, the coordinate setting for locking the camera on the still picture marking position D(5) between the next way points WPT(2) and WPT(3) and sets various camera conditions including the angle of view which satisfy the specified still picture size. Moreover, the shooting information generating part 29 adds a still picture mark to the video signal 111 from the camera part 28, and creates the associated data 114 based on the position/attitude information 105 provided from the position/attitude detecting part 23 when the still picture mark was added and the shooting information 112 from the camera part 28.

When the helicopter 3 is at the still picture marking position D(8) between the way points WPT(3) and WPT(4), the flight path display control part 25 effects the same display control as in the case of the standby area E by the flight path display control information 107, and the shooting control part 27 outputs the still picture marking instruction 109 to the shooting information generating part 29, after which it performs, by the camera control information 108, the coordinate setting for locking the camera on the still picture marking position D(8) between the next way points WPT(3) and WPT(4) and sets various camera conditions including the angle of view which satisfy the specified still picture size. Moreover, the shooting information generating part 29 adds a still picture mark to the video signal 111 from the camera part 28, and creates the associated data 114 based on the position/attitude information 105 provided from the position/attitude detecting part 23 when the still picture mark was added and the shooting information 112 from the camera part 28. Besides, the shooting control part 28 confirms the completion of the flight plan 106, and provides the progress-of-shooting information 110 to the shooting planning part 24.

The flight plan 106 made as described above is stored in the flight plan storage part 55. The flight plan management part 56 of the shooting planning part 24 reads out the flight plan 106 from the flight plan storage part 55 and provides it to the flight path display control part 25, the shooting control part 27 and the shooting information generating part 29, by which the flight plan 106 shown in FIG. 28, that is, the specified line shooting (P3) is implemented and desired still pictures can be extracted in the information display device 4.

While in the above the shooting instruction device 1 and the information display device 4 have been described to be located on the ground, they may also be loaded on a ship, airplane, satellite, or the like. The video camera apparatus 2, though described to be loaded on the helicopter 3, may also be loaded on some other aircraft that can fly over a disaster-stricken area.

In this embodiment the shooting planning part 24 is provided with the model shooting pattern storage part 51 in which to store each basic shooting pattern (P) contained in the model shooting pattern (Q) and the shooting conditions therefore so as to reduce the amount of data for communication between the shooting instruction device 1 and the video camera apparatus 2 in the case of the shooting instruction 103 for the model shooting pattern (Q). The shooting planning part 24 may also be adapted to store the shooting conditions for the basic shooting patterns (P), in which case the shooting instruction device 1 can send the kind of shooting pattern as the shooting instruction 103. This permits simplification of the operation for inputting the shooting conditions or the like in the shooting instruction device 1 and reduction of the amount of data to be sent between the shooting instruction device 1 and the video camera apparatus 2, making it possible to cope with the disaster more quickly.

On the contrary, even in the case where the shooting planning part 24 is not equipped with the model shooting pattern storage part 51 and the shooting instruction 103 is for the model shooting pattern (Q), the shooting conditions may be input in the shooting instruction device 1. This involves inputting of the shooting conditions in the shooting instruction device 1 and causes an increase in the amount of data to be sent from the shooting instruction device 1 to the video camera apparatus 2. In this case, however, since the shooting planning part 24 does not require such a large storage capacity as that of the shooting pattern storage part 51, the video camera apparatus 2 can be made simple in structure and compact in size which is preferable for loading on an aircraft.

As described above, according to the present invention, the shooting instruction device 1 selects an appropriate one of preset shooting patterns in accordance with the type, scale and temporal variation of the disaster to cope with, and sends the shooting instruction 103 based on the selected shooting pattern and the shooting conditions corresponding thereto, or the shooting instruction 103 based on the selected shooting pattern, to the video camera apparatus 2 loaded on the helicopter 3. The video camera apparatus 2 responds to the shooting instruction 103 to make the flight plan 106 and add a still picture mark to the video signal 111 resulting from shooting of the target, thereafter sending the video signal 113 with still picture mark to the information display device 4 together with the associated data 114. The information display device 4 extracts the still picture 115 from the video signal 113, and displays it along with the associated data 114. Hence, the present invention makes it possible to provide accurate information on the disaster in a short time and reduce the load on operators of the shooting instruction device 1 and the information display device 4; furthermore, observations of the disaster are not subject to individual operators' judgment.

EFFECT OF THE INVENTION

As described above, according to an aspect of the present invention, the shooting instruction device: responds to an operator's instruction to select a desired one of a plurality of prestored shooting patterns; inputs shooting conditions corresponding to the selected shooting pattern; and sends to the video camera apparatus a shooting instruction based on the selected shooting pattern or shooting instruction based on the selected shooting pattern and the input shooting conditions. The video camera apparatus: receives the shooting instruction from the shooting instruction device; make reference to map data and position/attitude information of the aircraft; based on the received shooting instruction, computes a sill picture marking position for extracting a still picture; makes a flight plan which satisfies the shooting instruction; based on the flight plan, display the flight path of the aircraft and shoots a shooting target; and adds a still picture mark to the video signal obtained at the still picture marking position, and sends a video signal with still picture mark and data associated with the shooting. The information display device: receives the video signal with still picture mark sent from the video camera apparatus; extracts the still picture from the video signal with still picture mark; and displays the still picture together with the associated data. With the shooting instruction device, it is possible to grasp the situations of the shooting target quickly and accurately, reduce the load on an operator and prevent that the disaster information is subject to individual operators' judgment.

According to the present invention, the video camera apparatus According to another aspect of the invention, the video camera apparatus comprising: a shooting instruction receiving part for receiving the shooting instruction sent from the outside over a radio channel; a map data storage part with two- and three dimensional map data stored therein; a position/attitude detecting part for detecting the position/attitude information of the aircraft; a shooting planning part which: makes reference to map data in the second map data storage part and the position/attitude information detected by the position/attitude detecting part; based on the shooting instruction received in the shooting instruction receiving part, computes a still picture marking position for extracting a still picture; and makes a flight plan which satisfies the shooting instruction; a flight path display control part which makes reference to map data in the second map data storage part and the position/attitude information detected by the position/attitude detecting part, and creates flight path information of the aircraft based on the flight plan made by the shooting planning part; a flight path display part for displaying the flight path of the aircraft based on the flight path display information; a shooting control part which: makes reference to the position/attitude information of the aircraft detected by the position/attitude detecting part; based one the flight plan made by the shooting planning part, sets camera conditions and outputs camera control conditions; and outputs a still picture marking instruction for adding a still picture mark to a video signal obtained by shooting; a camera part for shooting a shooting target based on the camera control information and for outputting a video signal and associated shooting conditions; a shooting information generating part which, following the flight pan made by the shooting planning part, adds a still picture mark to the video signal from the camera part based on the still picture marking instruction from the shooting control part, then outputs a video signal with still picture mark, and outputs as the associated data said position/attitude information of the aircraft when the still picture mark was added and the shooting conditions from the camera part; and a shooting result transmitting part for sending to the outside over a radio channel the video signal with still picture mark and the associated data provided from the shooting information generating part. With the video camera apparatus, it is possible to transmit the situations of the shooting target quickly and accurately, reduce the load on an operator and prevent that the disaster information is subject to individual operators' judgment.

According to the present invention, the remote-controlled shooting method comprises the steps of: (1) selecting a desired one of a plurality of prestored shooting patterns in response to an operator's instruction; (2) inputting shooting conditions corresponding to the selected shooting pattern in response to an operator's instruction; (3) outputting an shooting instruction based on the shooting pattern selected in step (1), or a shooting instruction based on said shooting pattern selected in step (1) and the shooting conditions input in step (2); (4) sending the shooting instruction to an aircraft over a radio channel; (5) receiving the shooting instruction; (6) making reference to map data and position/attitude information of the aircraft, computing a still picture marking position for extracting a still picture based on the received shooting instruction, and making a flight plan which satisfies the shooting instruction; (7) displaying a flight path of the aircraft based on the flight plan; (8) shooting a shooting target; (9) adding a still picture to the resulting video signal to extract therefrom a still picture; (10) sending over a radio channel a video signal with the still picture mark and data associated with shooting; (11) receiving the video signal with the still picture mark and the associated data sent over the radio channel; (12) extracting a still picture from the video signal with the still picture mark; and (13) displaying the extracted still picture and the associated data.

What is claimed is:

1. A remote-controlled shooting system which is provided with a video camera apparatus loaded on an aircraft, a shooting instruction device for sending a shooting instruction to said video camera apparatus over a radio channel, and an information display device for displaying the results of shooting by said video camera apparatus sent thereto over a radio channel, wherein:

said shooting instruction device: responds to an operator's instruction to select a desired one of a plurality of prestored shooting patterns; inputs shooting conditions corresponding to said selected shooting pattern; and sends to said video camera apparatus a shooting instruction based on said selected shooting pattern or shooting instruction based on said selected shooting pattern and said input shooting conditions;

said video camera apparatus: receives said shooting instruction from said shooting instruction device; make reference to map data and position/attitude information of said aircraft; based on said received shooting instruction, computes a still picture marking position for extracting a still picture; makes a flight plan which satisfies said shooting instruction; based on said flight plan, display the flight path of said aircraft and shoots a shooting target; and adds a still picture mark to the video signal obtained at said still picture marking position, and sends a video signal with still picture mark and data associated with said shooting; and said information display device: receives said video signal with still picture mark sent from said video camera apparatus; extracts said still picture from said video signal with still picture mark; and displays said still picture together with said associated data.

2. The remote-controlled shooting system of claim 1, wherein said shooting instruction device comprises:

a shooting pattern storage part with a plurality of shooting patterns stored therein;

a first map data storage part with map data stored therein;

a shooting instruction input part which selects one of said plurality of shooting patterns stored in said shooting pattern storage part in response to said operator's instruction, inputs said shooting conditions through use of said map data in said first map data storage part corresponding to said selected shooting pattern, and outputs said shooting instruction based on said selected shooting pattern, or said shooting instruction based on said selected shooting pattern and said input shooting conditions; and a shooting instruction transmitting part for sending said shooting instruction from said shooting instruction input part over a radio channel.

3. The remote-controlled shooting system of claim 2, wherein said shooting pattern storage part has stored therein, as said plurality of shooting patterns, a plurality of basic shooting patterns and a plurality of model shooting patterns which are combinations of said basic shooting patterns.

4. The remote-controlled shooting system of claim 3, wherein said shooting pattern storage part has stored therein, as one of said basic shooting patterns, a single-point shooting pattern for extracting one still picture at a point specified by some coordinates from a video image obtained by said video camera apparatus.

5. The remote-controlled shooting system of claim 3, wherein said shooting pattern storage part has stored therein, as one of said basic shooting patterns, a multiple-point shooting pattern for extracting, at fixed time intervals, a plurality of still pictures at points specified by some coordinates from a video image obtained by said video camera apparatus.

6. The remote-controlled shooting system of claim 3, wherein said shooting pattern storage part has stored therein, as one of said basic shooting patterns, a line shooting pattern for shooting a continuously stretching shooting target and for extracting a plurality of still pictures.

7. The remote-controlled shooting system of claim 3, wherein said shooting pattern storage part has stored therein, as one of said basic shooting patterns, an area shooting pattern for shooting a wide shooting target area and for extracting a plurality of still pictures.

8. The remote-controlled shooting system of claim 3, wherein said shooting pattern storage part has stored therein, as one of said basic shooting patterns, a spotlight shooting pattern for shooting a target from said aircraft flying around a spot specified on a map and for extracting a plurality of still pictures shot from different directions.

9. The remote-controlled shooting system of claim 3, wherein said shooting pattern storage part has stored therein, as one of said basic shooting patterns, a panoramic shooting pattern for shooting a target from said aircraft hovering over its center while turning a camera and for extracting a plurality of still pictures shot from different directions.

10. The remote-controlled shooting system of claim 1, wherein said video camera apparatus comprises:

a shooting instruction receiving part for receiving said shooting instruction from said shooting instruction device;

a second map data storage part with two- and three dimensional map data stored therein;

a position/attitude detecting part for detecting the position/attitude information of said aircraft;

a shooting planning part which: makes reference to map data in said second map data storage part and said position/attitude information detected by said position/attitude detecting part; based on said shooting instruction received in said shooting instruction receiving part, computes a still picture marking position for extracting a still picture; and makes a flight plan which satisfies said shooting instruction;

a flight path display control part which makes reference to map data in said second map data storage part and said position/attitude information detected by said position/attitude detecting part, and creates flight path information of said aircraft based on said flight plan made by said shooting planning part;

a flight path display part for displaying the flight path of said aircraft based on said flight path display information;

a shooting control part which: makes reference to said position/attitude information of said aircraft detected by said position/attitude detecting part; based on said flight plan made by said shooting planning part, sets camera conditions and outputs camera control conditions; and outputs a still picture marking instruction for adding a still picture mark to said video signal obtained by shooting;

a camera part for shooting a shooting target based on said camera control information and for outputting a video signal and associated shooting conditions;

a shooting information generating part which, following said flight pan made by said shooting planning part, adds a still picture mark to said video signal from said camera part based on said still picture marking instruction from said shooting control part, then outputs a video signal with still picture mark, and outputs as said associated data said position/attitude information of said aircraft when said still picture mark was added and said shooting conditions from said camera part; and a shooting result transmitting part for sending over a radio channel said video signal with still picture mark and said associated data provided from said shooting information generating part.

11. The remote-controlled shooting system of claim 10, wherein said shooting planning part comprises:

a model shooting pattern storage part having stored therein a model shooting pattern and its shooting conditions, said model shooting pattern being a combination of basic shooting patterns;

a shooting instruction decision part which: receives said shooting instruction and decides the shooting pattern instructed by said shooting instruction device; in the case of a basic shooting pattern, outputs said received shooting instruction intact; and in the case of a model shooting pattern, reads out each basic shooting pattern contained in said model shooting pattern stored in said model shooting pattern storage part and said shooting conditions corresponding thereto, and outputs them as said shooting instruction;

a shooting instruction storage part for storing said shooting instruction provided from said shooting instruction decision part;

a flight plan preparing part which: reads out said shooting instruction stored in said shooting instruction storage part; makes reference to said map data in said second map data storage part and said position/attitude information of said aircraft detected in said position/attitude detecting part; computes a still picture marking position for extracting a still picture; and makes a flight plan which satisfies said shooting instruction;

a flight plan storage part for storing said flight plan made by said flight plan generating part; and a flight plan management part for reading out said flight plan stored in said flight plan storage part and outputs said read-out flight plan.

12. The remote-controlled shooting system of claim 11, wherein in the case of having received a shooting instruction indicating the single-point shooting as the shooting pattern and the position of the shooting target and the still picture size as the shooting conditions, said flight plan preparing part obtains altitude data of said shooting target position from said map data in said second map data storage part, computes the shooting distance from said shooting target position which provides said still picture size, obtains the current position of said aircraft from said position/attitude information detected by said position/attitude detecting part, obtains an approach path of said aircraft from said current position of said aircraft and said shooting target position; obtains altitude data from said shooting target position to the position of said shooting distance on said approach path from said map data in said second map data storage part, and computes the intersection of the lowest altitude where said shooting target can be seen and said shooting distance on said approach path, thereby computing a still picture marking position.

13. The remote-controlled shooting system of claim 11, wherein in the case of having received a shooting instruction indicating the line shooting as the shooting pattern and a plurality of way points and the still picture size as the shooting conditions, said flight plan preparing part computes each still picture marking position between said way points in a manner to provide overlapping of still pictures, obtains altitude data of said each still picture marking position from the map data in said second map data storage part, and calculates the flight altitude of said aircraft from the maximum altitude in said altitude data.

14. The remote-controlled shooting system of claim 10, wherein when said shooting information generating part adds a still picture mark to the video signal from said camera part, said still picture mark is superimposed on a vertical sync signal in said video signal.

15. The remote-controlled shooting system of claim 1, wherein said information display device comprises:
- a shooting result receiving part for receiving said video signal with still picture mark and said associated data from said video camera apparatus;
- a still picture extracting part for extracting said still picture from said video signal with still picture mark received in said shooting result receiving part and for outputting said still picture together with said associated data;
- a database storage part for storing said still picture and said associated data output from said still picture extracting part;
- a third map data storage part for storing map data; and
- a shooting information display part which reads out said still picture and said associated data stored in said database storage part and display them on the map data read out of said third map data storage part.

16. The remote-controlled shooting system of claim 15, wherein said still picture extracting part responds to said shooting instruction from said shooting instruction device to perform still picture processing such as joining together extracted still pictures or estimation of a burning area.

17. A video camera apparatus which is loaded on an aircraft and shoots a shooting target in response to an external shooting instruction, said video camera apparatus comprising:
- a shooting instruction receiving part for receiving said shooting instruction sent over a radio channel;
- a map data storage part with two- and three dimensional map data stored therein;
- a position/attitude detecting part for detecting the position/attitude information of said aircraft;
- a shooting planning part which: makes reference to map data in said second map data storage part and said position/attitude information detected by said position/attitude detecting part; based on said shooting instruction received in said shooting instruction receiving part, computes a still picture marking position for extracting a still picture; and makes a flight plan which satisfies said shooting instruction;
- a flight path display control part which makes reference to map data in said second map data storage part and said position/attitude information detected by said position/attitude detecting part, and creates flight path information of said aircraft based on said flight plan made by said shooting planning part;
- a flight path display part for displaying the flight path of said aircraft based on said flight path display information;
- a shooting control part which: makes reference to said position/attitude information of said aircraft detected by said position/attitude detecting part; based on said flight plan made by said shooting planning part, sets camera conditions and outputs camera control conditions; and outputs a still picture marking instruction for adding a still picture mark to a video signal obtained by shooting;
- a camera part for shooting a shooting target based on said camera control information and for outputting a video signal and associated shooting conditions;
- a shooting information generating part which, following said flight plan made by said shooting planning part, adds a still picture mark to said video signal from said camera part based on said still picture marking instruction from said shooting control part, then outputs a video signal with still picture mark, and outputs as said associated data said position/attitude information of said aircraft when said still picture mark was added and said shooting conditions from said camera part; and
- a shooting result transmitting part for sending to the outside over a radio channel said video signal with still picture mark and said associated data provided from said shooting information generating part.

18. The video camera apparatus of claim 17, wherein said shooting planning part comprises:
- a model shooting pattern storage part having stored therein a model shooting pattern and its shooting conditions, said model shooting pattern being a combination of basic shooting patterns;
- a shooting instruction decision part which: receives said shooting instruction and decides the shooting pattern instructed by said shooting instruction device; in the case of a basic shooting pattern, outputs said received shooting instruction intact; and in the case of a model shooting pattern, reads out each basic shooting pattern contained in said model shooting pattern stored in said model shooting pattern storage part and said shooting conditions corresponding thereto, and outputs them as said shooting instruction;
- a shooting instruction storage part for storing said shooting instruction provided from said shooting instruction decision part;
- a flight plan preparing part which: reads out said shooting instruction stored in said shooting instruction storage part; makes reference to said map data in said second map data storage part and said position/attitude information of said aircraft detected in said position/attitude detecting part; computes a still picture marking position for extracting a still picture; and makes a flight plan which satisfies said shooting instruction;

a flight plan storage part for storing said flight plan made by said flight plan generating part; and a flight plan management part for reading out said flight plan stored in said flight plan storage part and outputs said read-out flight plan.

19. The video camera apparatus of claim 18, wherein in the case of having received a shooting instruction indicating the single-point shooting as the shooting pattern and the position of the shooting target and the still picture size as the shooting conditions, said flight plan preparing part obtains altitude data of said shooting target position from said map data in said map data storage part, computes the shooting distance from said shooting target position which provides said still picture size, obtains the current position of said aircraft from said position/attitude information detected by said position/attitude detecting part, obtains an approach path of said aircraft from said current position of said aircraft and said shooting target position; obtains altitude data from said shooting target position to the position of said shooting distance on said approach path from said map data in said map data storage part, and computes the intersection of the lowest altitude where said shooting target can be seen and said shooting distance on said approach path, thereby computing a still picture marking position.

20. The video camera apparatus of claim 18, wherein in the case of having received a shooting instruction indicating the line shooting as the shooting pattern and a plurality of way points and the still picture size as the shooting conditions, said flight plan preparing part computes each still picture marking position between said way points in a manner to provide overlapping of still pictures, obtains altitude data of said each still picture marking position from the map data in said map data storage part, and calculates the flight altitude of said aircraft from the maximum altitude in said altitude data.

21. The video camera apparatus of claim 17, wherein when said shooting information generating part adds a still picture mark to the video signal from said camera part, said still picture mark is superimposed on a vertical sync signal in said video signal.

22. A remote-controlled shooting method comprising the steps of:

(1) selecting a desired one of a plurality of prestored shooting patterns in response to an operator's instruction;

(2) inputting shooting conditions corresponding to said selected shooting pattern in response to an operator's instruction;

(3) outputting an shooting instruction based on said shooting pattern selected in said step (1), or a shooting instruction based on said shooting pattern selected in said step (1) and said shooting conditions input in said step (2);

(4) sending said shooting instruction to an aircraft over a radio channel;

(5) receiving said shooting instruction;

(6) making reference to map data and position/attitude information of said aircraft, computing a still picture marking position for extracting a still picture based on said received shooting instruction, and making a flight plan which satisfies said shooting instruction;

(7) displaying a flight path of said aircraft based on said flight plan;

(8) shooting a shooting target;

(9) adding a still picture to the resulting video signal to extract therefrom a still picture;

(10) sending over a radio channel a video signal with said still picture mark and data associated with shooting;

(11) receiving said video signal with said still picture mark and said associated data sent over said radio channel;

(12) extracting a still picture from said video signal with said still picture mark; and

(13) displaying said extracted still picture and said associated data.

23. The remote-controlled shooting method of claim 22, wherein said plurality of preset shooting patterns in said step (1) are a plurality of basic shooting patterns and a plurality of model shooting patterns, each consisting of a combination of said basic shooting patterns.

24. The remote-controlled shooting method of claim 22, wherein said step (9) is a step of superimposing said still picture mark on a vertical sync signal of said video signal.

25. The remote-controlled shooting method of claim 22, wherein said step (12) includes a step of performing still picture processing such as combining still pictures or estimation of a burning area in response to said shooting instruction.

* * * * *